(12) United States Patent
Gogte et al.

(10) Patent No.: US 12,405,695 B2
(45) Date of Patent: Sep. 2, 2025

(54) ACTIVE AREA ROUTING FOR TOUCH ELECTRODES

(71) Applicant: Apple Inc., Cupertino, CA (US)

(72) Inventors: Ashray Vinayak Gogte, Campbell, CA (US); Christophe Blondin, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/615,701

(22) Filed: Mar. 25, 2024

(65) Prior Publication Data
US 2024/0231552 A1 Jul. 11, 2024

Related U.S. Application Data

(63) Continuation of application No. 17/818,695, filed on Aug. 9, 2022, now Pat. No. 11,941,214, which is a
(Continued)

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/0448* (2019.05);
(Continued)

(58) Field of Classification Search
CPC .... G06F 3/0446; G06F 3/0412; G06F 3/0448; G06F 2203/04111; G06F 2203/04112;
(Continued)

(56) References Cited

U.S. PATENT DOCUMENTS

| 8,947,370 B2 | 2/2015 | An et al. |
| 9,280,233 B1 | 3/2016 | Tong |

(Continued)

FOREIGN PATENT DOCUMENTS

| CN | 101566895 A | 10/2009 |
| CN | 102929576 A | 2/2013 |

(Continued)

OTHER PUBLICATIONS

Non-Final Office Action received for U.S. Appl. No. 18/154,693, mailed on Oct. 12, 2023, 36 pages.
(Continued)

*Primary Examiner* — Sahlu Okebato
(74) *Attorney, Agent, or Firm* — Kubota & Basol LLP

(57) ABSTRACT

Touch sensor panels/screens can include metal mesh touch electrodes and routing in the active area. In some examples, the touch sensor panel/screen can include row electrodes and column electrodes disposed over the active area of the display. In some examples, the routing traces for the row electrodes and/or column electrodes can be disposed in a border region and some of the routing traces for the row electrodes and/or column electrodes can be disposed in the active area. In some examples, some row electrodes can be shaved down to create an offset from the edge of the active area to accommodate routing traces in the active area. In some examples, the row electrodes can be formed in a first metal mesh layer and some routing traces in the active area can be formed in a second metal mesh layer, different from the first metal mesh layer.

20 Claims, 14 Drawing Sheets

Related U.S. Application Data continuation of application No. 17/067,579, filed on Oct. 9, 2020, now Pat. No. 11,449,182.

(60) Provisional application No. 62/933,894, filed on Nov. 11, 2019.

(52) U.S. Cl.
CPC .............. *G06F 2203/04111* (2013.01); *G06F 2203/04112* (2013.01)

(58) Field of Classification Search
CPC ........... G06F 3/04164; G06F 3/041662; G06F 3/0445; G06F 3/044; G06F 2203/04107
See application file for complete search history.

(56) References Cited

U.S. PATENT DOCUMENTS

| | | | |
|---|---|---|---|
| 9,627,463 | B2 | 4/2017 | Kwon et al. |
| 9,706,607 | B2 | 7/2017 | Kim et al. |
| 9,798,430 | B2 | 10/2017 | Hayashi et al. |
| 9,811,221 | B2 | 11/2017 | Hayashi et al. |
| 9,921,696 | B2 | 3/2018 | Hotelling et al. |
| 9,927,832 | B2 | 3/2018 | Tanemura et al. |
| 10,324,575 | B2 | 6/2019 | Hwang et al. |
| 10,915,190 | B2 | 2/2021 | Gong |
| 11,556,216 | B2 | 1/2023 | Blondin et al. |
| 2012/0081324 | A1 | 4/2012 | Philipp |
| 2013/0191804 | A1* | 7/2013 | Bytheway ............. G06F 3/0445 716/126 |
| 2014/0035833 | A1 | 2/2014 | Gorsica et al. |
| 2014/0118299 | A1 | 5/2014 | Wang et al. |
| 2014/0160373 | A1 | 6/2014 | Hsu et al. |
| 2014/0347319 | A1 | 11/2014 | Lin et al. |
| 2015/0001060 | A1 | 1/2015 | Kim et al. |
| 2015/0002752 | A1 | 1/2015 | Shepelev et al. |
| 2015/0054803 | A1 | 2/2015 | Yashiro et al. |
| 2015/0084922 | A1 | 3/2015 | Park et al. |
| 2015/0242013 | A1 | 8/2015 | Ono et al. |
| 2016/0048248 | A1* | 2/2016 | Na .......................... G06F 3/047 345/174 |
| 2016/0139725 | A1 | 5/2016 | Noguchi et al. |
| 2016/0170518 | A1 | 6/2016 | Donnelly |
| 2017/0193265 | A1 | 7/2017 | Chan et al. |
| 2017/0262097 | A1 | 9/2017 | Rowe et al. |
| 2017/0269744 | A1 | 9/2017 | Gharghi et al. |
| 2018/0024673 | A1 | 1/2018 | Han et al. |
| 2018/0067584 | A1* | 3/2018 | Zhu ..................... G06F 3/04164 |
| 2018/0069191 | A1 | 3/2018 | Lee et al. |
| 2018/0129351 | A1 | 5/2018 | Qiao et al. |
| 2018/0157354 | A1 | 6/2018 | Blondin et al. |
| 2018/0203531 | A1 | 7/2018 | Tsai et al. |
| 2018/0224967 | A1 | 8/2018 | Church et al. |
| 2019/0056819 | A1 | 2/2019 | Moon et al. |
| 2019/0204974 | A1 | 7/2019 | Gong |
| 2019/0294278 | A1 | 9/2019 | Kim et al. |
| 2021/0141491 | A1 | 5/2021 | Gogte et al. |
| 2021/0240303 | A1 | 8/2021 | Blondin et al. |
| 2021/0365153 | A1 | 11/2021 | Feng |
| 2022/0382416 | A1 | 12/2022 | Gogte et al. |
| 2023/0168783 | A1 | 6/2023 | Blondin et al. |
| 2024/0377915 | A1 | 11/2024 | Blondin et al. |

FOREIGN PATENT DOCUMENTS

| | | | |
|---|---|---|---|
| CN | 104331189 | A | 2/2015 |
| CN | 205080527 | U | 3/2016 |
| CN | 105706020 | A | 6/2016 |
| CN | 106325590 | A | 1/2017 |
| CN | 106775066 | A | 5/2017 |
| CN | 108735781 | A | 11/2018 |
| CN | 110347278 | A | 10/2019 |
| CN | 118011701 | A * | 5/2024 |
| DE | 102018205445 | A1 | 10/2019 |
| JP | 2015-106240 | A | 6/2015 |
| KR | 10-2011-0104349 | A | 9/2011 |
| KR | 10-2012-0020929 | A | 3/2012 |
| KR | 10-2013-0035763 | A | 4/2013 |
| KR | 10-2013-0069938 | A | 6/2013 |
| KR | 10-2014-0018120 | A | 2/2014 |
| KR | 10-2015-0106085 | A | 9/2015 |
| KR | 10-2018-0025036 | A | 3/2018 |
| KR | 10-2018-0036431 | A | 4/2018 |
| KR | 10-2018-0047586 | A | 5/2018 |
| KR | 10-2018-0047604 | A | 5/2018 |
| KR | 10-2018-0079025 | A | 7/2018 |
| KR | 10-2019-0047536 | A | 5/2019 |
| KR | 10-2019-0111176 | A | 10/2019 |
| KR | 10-2020-0009800 | A | 1/2020 |

OTHER PUBLICATIONS

Notice of Allowability received for U.S. Appl. No. 18/154,693, mailed on Mar. 19, 2024, 12 pages.
Search Report received for Chinese Patent Application No. 202110143632.3, mailed on Mar. 7, 2024, 5 pages (3 pages of English Translation & 2 pages of Official Copy).
Advisory Action received for U.S. Appl. No. 17/067,579, mailed on Mar. 4, 2022, 2 pages.
Final Office Action received for U.S. Appl. No. 16/998,812, mailed on Dec. 29, 2021, 27 pages.
Final Office Action received for U.S. Appl. No. 17/067,579, mailed on Nov. 17, 2021, 13 pages.
Non-Final Office Action received for U.S. Appl. No. 16/998,812, mailed on Jul. 8, 2021, 21 pages.
Non-Final Office Action received for U.S. Appl. No. 16/998,812, mailed on Mar. 31, 2022, 29 pages.
Non-Final Office Action received for U.S. Appl. No. 17/067,579, mailed on Jun. 10, 2021, 15 pages.
Non-Final Office Action received for U.S. Appl. No. 17/818,695, mailed on Jul. 7, 2023, 14 pages.
Notice of Allowability received for U.S. Appl. No. 17/818,695, mailed on Feb. 21, 2024, 2 pages.
Notice of Allowance received for U.S. Appl. No. 16/998,812, mailed on Sep. 9, 2022, 12 pages.
Notice of Allowance received for U.S. Appl. No. 17/067,579, mailed on May 4, 2022, 9 Pages.
Notice of Allowance received for U.S. Appl. No. 17/818,695, mailed on Oct. 31, 2023, 8 pages.
Search Report received for Chinese Patent Application No. 202011228173.0, mailed on Jan. 3, 2024, 6 pages (3 pages of English Translation and 3 pages of Official Copy).
Corrected Notice of Allowability received for U.S. Appl. No. 18/154,693, mailed on Jun. 5, 2024, 2 pages.
Search Report received for Chinese Patent Application No. 202011228173.0, mailed on Jun. 5, 2024, 3 pages (1 page of English Translation and 2 pages of Official Copy).
Search Report received for Chinese Patent Application No. 202110143632.3, mailed on Jul. 18, 2024, 4 pages (1 page of English Translation and 3 pages of Official Copy).

* cited by examiner

ACTIVE AREA ROUTING FOR TOUCH ELECTRODES

CROSS-REFERENCE TO RELATED APPLICATIONS

This application is a continuation of U.S. patent application Ser. No. 17/818,695, published on Dec. 1, 2022 as U.S. Publication No. 2022-0382416, filed Aug. 9, 2022, which is a continuation of U.S. patent application Ser. No. 17/067,579, issued on Sep. 20, 2022 as U.S. Pat. No. 11,449,182, filed Oct. 9, 2020, which claims the benefit of U.S. Provisional Application No. 62/933,894, filed Nov. 11, 2019, the contents of which are hereby incorporated by reference in their entireties for all purposes.

FIELD OF THE DISCLOSURE

This relates generally to touch sensor panels/screens, and more particularly to touch sensor panels/screens including metal mesh touch electrodes and routing in the active area.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of partially or fully transparent or non-transparent conductive plates (e.g., touch electrodes) made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). It is due in part to their substantial transparency that some capacitive touch sensor panels can be overlaid on a display to form a touch screen, as described above. Some touch screens can be formed by at least partially integrating touch sensing circuitry into a display pixel stack-up (i.e., the stacked material layers forming the display pixels).

BRIEF SUMMARY OF THE DISCLOSURE

This relates to touch sensor panels/screens including metal mesh touch electrodes and routing in the active area. In some examples, the touch sensor panel/screen can include row electrodes and column electrodes disposed over the active area of the display (the area of the display visible to a user). In some examples, the routing traces for the row electrodes and/or column electrodes can be disposed in a border region and some of the routing traces for the row electrodes and/or column electrodes can be disposed in the active area. In some examples, some row electrodes can be shaved down to create an offset from the edge of the active area to accommodate routing traces in the active area. In some examples, the row electrodes can be formed in a first metal mesh layer and some routing traces in the active area can be formed in a second metal mesh layer, different from the first metal mesh layer.

DETAILED DESCRIPTION OF THE DISCLOSURE

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to touch sensor panels/screens including metal mesh touch electrodes and routing in the active area. In some examples, the touch sensor panel/screen can include row electrodes and column electrodes disposed over the active area of the display (the area of the display visible to a user). In some examples, the routing traces for the row electrodes and/or column electrodes can be disposed in a border region and some of the routing traces for the row electrodes and/or column electrodes can be disposed in the active area. In some examples, some row electrodes can be shaved down to create an offset from the edge of the active area to accommodate routing traces in the active area. In some examples, the row electrodes can be formed in a first metal mesh layer and some routing traces in the active area can be formed in a second metal mesh layer, different from the first metal mesh layer.

Figure 1A:
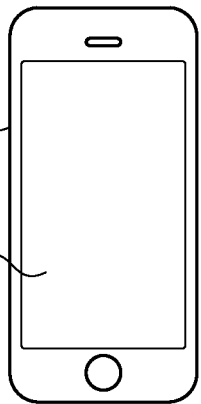
FIGS. 1A-1E illustrate example systems that can include a touch screen according to examples of the disclosure.
Figure 1B:
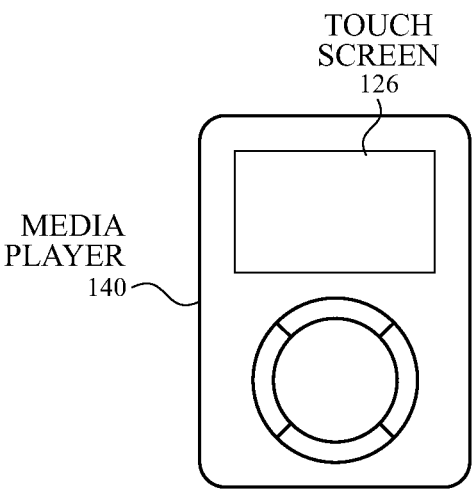
Figure 1C:
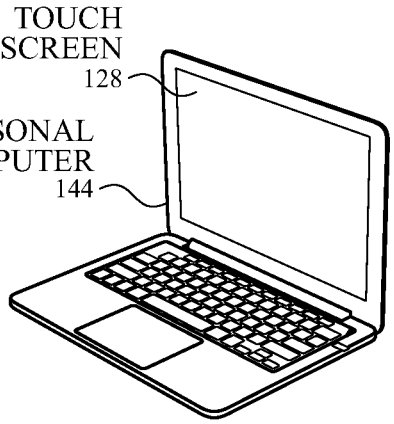
Figure 1D:
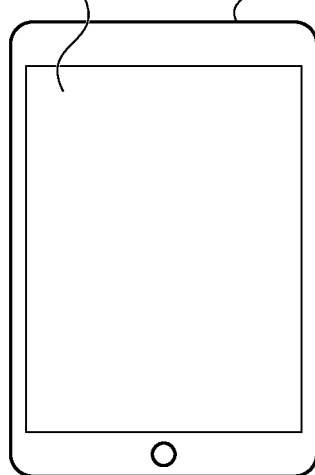
Figure 1E:
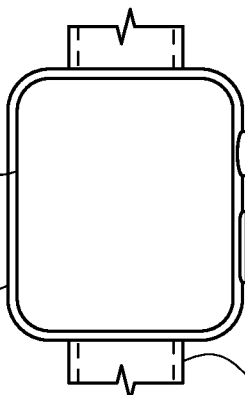

FIGS. 1A-1E illustrate example systems that can include a touch screen according to examples of the disclosure. FIG. 1A illustrates an example mobile telephone 136 that includes a touch screen 124 according to examples of the disclosure. FIG. 1B illustrates an example digital media player 140 that includes a touch screen 126 according to examples of the disclosure. FIG. 1C illustrates an example personal computer 144 that includes a touch screen 128 according to examples of the disclosure. FIG. 1D illustrates an example tablet computing device 148 that includes a touch screen 130 according to examples of the disclosure. FIG. 1E illustrates an example wearable device 150 that includes a touch screen 132 and can be attached to a user using a strap 152 according to examples of the disclosure. It is understood that a touch screen can be implemented in other devices as well.

In some examples, touch screens 124, 126, 128, 130 and 132 can be based on self-capacitance. A self-capacitance based touch system can include a matrix of small, individual plates of conductive material or groups of individual plates of conductive material forming larger conductive regions that can be referred to as touch electrodes or as touch node electrodes (as described below with reference to FIG. 4B). For example, a touch screen can include a plurality of individual touch electrodes, each touch electrode identifying or representing a unique location (e.g., a touch node) on the touch screen at which touch or proximity is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the touch node electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128, 130 and 132 can be based on mutual capacitance. A mutual capacitance based touch system can include electrodes arranged as drive and sense lines that may cross over each other on different layers (in a double-sided configuration), or may be adjacent to each other on the same layer (e.g., as described below with reference to FIG. 4A). The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. As described herein, in some examples, a mutual capacitance based touch system can form touch nodes from a matrix of small, individual plates of conductive material.

In some examples, touch screens 124, 126, 128, 130 and 132 can be based on mutual capacitance and/or self-capacitance. The electrodes can be arrange as a matrix of small, individual plates of conductive material (e.g., as in touch node electrodes 408 in touch screen 402 in FIG. 4B) or as drive lines and sense lines (e.g., as in row touch electrodes 404 and column touch electrodes 406 in touch screen 400 in FIG. 4A), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
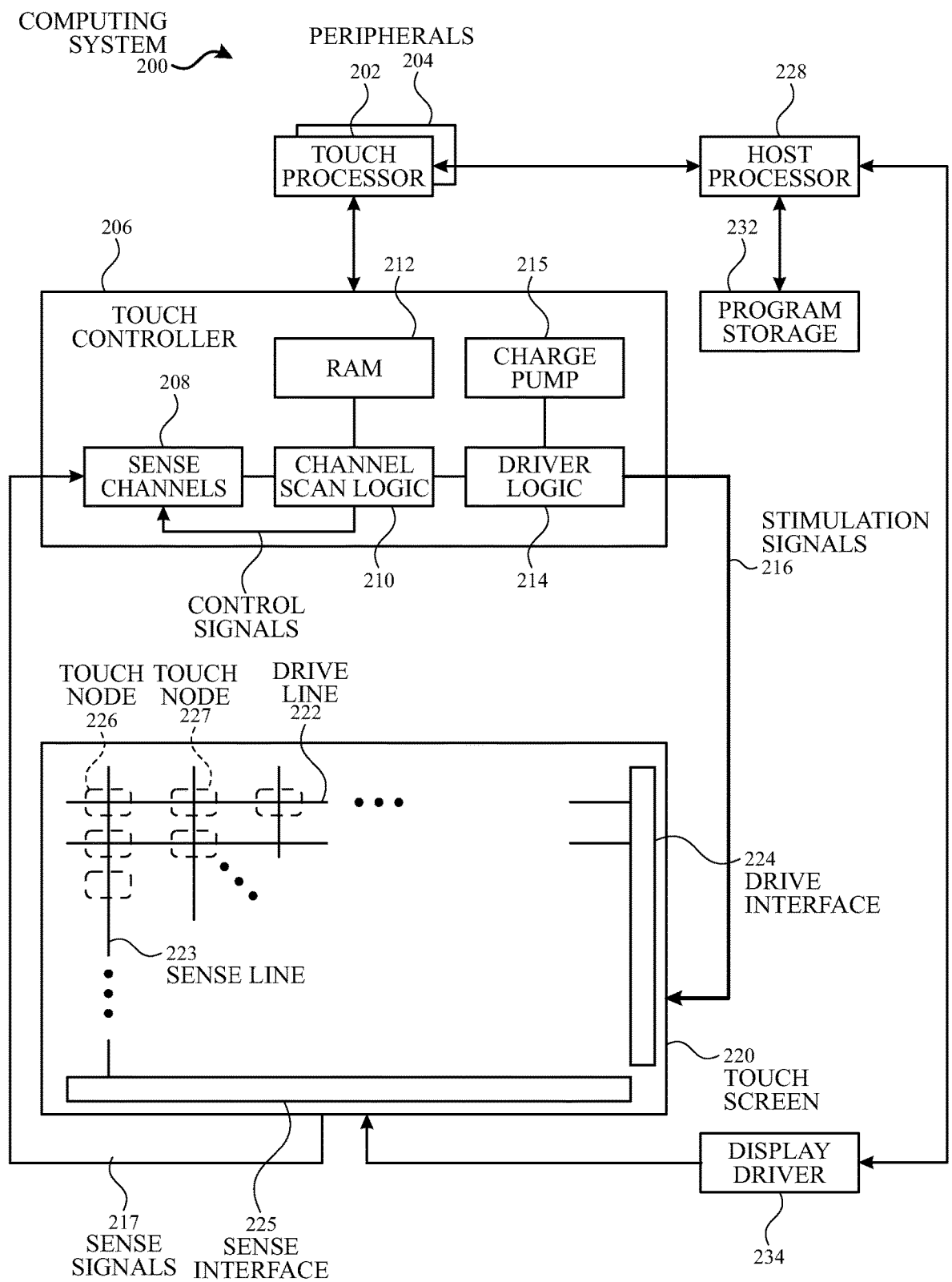
FIG. 2 illustrates an example computing system including a touch screen according to examples of the disclosure.

FIG. 2 illustrates an example computing system including a touch screen according to examples of the disclosure. Computing system 200 can be included in, for example, a mobile phone, tablet, touchpad, portable or desktop computer, portable media player, wearable device or any mobile or non-mobile computing device that includes a touch screen or touch sensor panel. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220, as described in more detail below. In some examples, touch controller 206, touch processor 202 and peripherals 204 can be integrated into a single application specific integrated circuit (ASIC), and in some examples can be integrated with touch screen 220 itself.

It should be apparent that the architecture shown in FIG. 2 is only one example architecture of computing system 200, and that the system could have more or fewer components than shown, or a different configuration of components. In some examples, computing system 200 can include an energy storage device (e.g., a battery) to provide a power supply and/or communication circuitry to provide for wired or wireless communication (e.g., cellular, Bluetooth, Wi-Fi, etc.). The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller/driver 234 (e.g., a Liquid-Crystal Display (LCD) driver). It is understood that although some examples of the disclosure may described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. Display driver 234 can provide voltages on select (e.g., gate) lines to each pixel transistor and can provide data signals along data lines to these same transistors to control the pixel display image.

Host processor 228 can use display driver 234 to generate a display image on touch screen 220, such as a display image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Touch screen 220 can be used to derive touch information at multiple discrete locations of the touch screen, referred to herein as touch nodes. Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 in touch controller 206. In this way, drive lines and sense lines can be part of the touch sensing circuitry that can interact to form capacitive sensing nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch nodes in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to drive logic 214 via drive interface 224 and sense lines 223 may be directly connected to sense channels 208 or indirectly connected to sense channels 208 via sense interface 225. In either case an electrical path for driving and/or sensing the touch nodes can be provided.

Figure 3A:
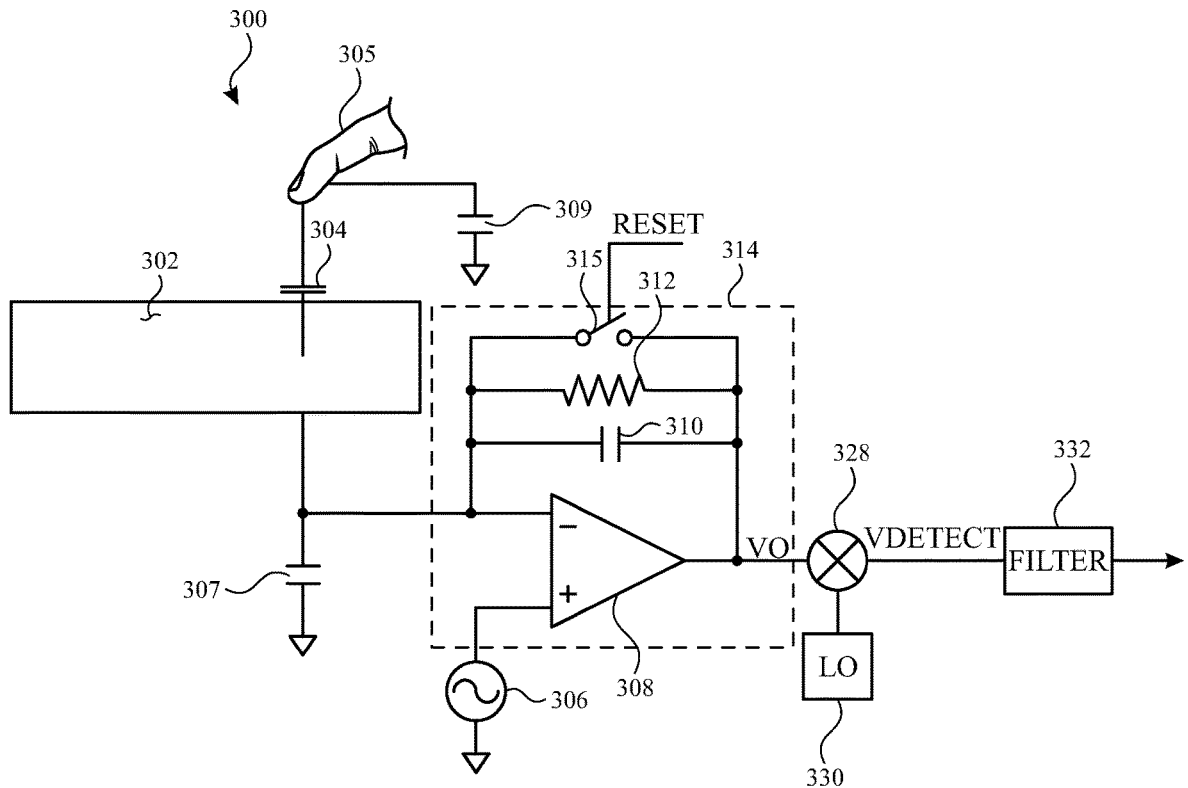
FIG. 3A illustrates an exemplary touch sensor circuit corresponding to a self-capacitance measurement of a touch node electrode and sensing circuit according to examples of the disclosure.

FIG. 3A illustrates an exemplary touch sensor circuit 300 corresponding to a self-capacitance measurement of a touch node electrode 302 and sensing circuit 314 according to examples of the disclosure. Touch node electrode 302 can correspond to a touch electrode 404 or 406 of touch screen 400 or a touch node electrode 408 of touch screen 402. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 ($V_{ac}$) can be coupled to the non-inverting input (+) of operational amplifier 308. Touch sensor circuit 300 can be configured to sense changes (e.g., increases) in the total self-capacitance 304 of the touch node electrode 302 induced by a finger or object either touching or in proximity to the touch sensor panel. Output 320 can be used by a processor to determine the presence of a proximity or touch event, or the output can be inputted into a discrete logic network to determine the presence of a proximity or touch event.

Figure 3B:
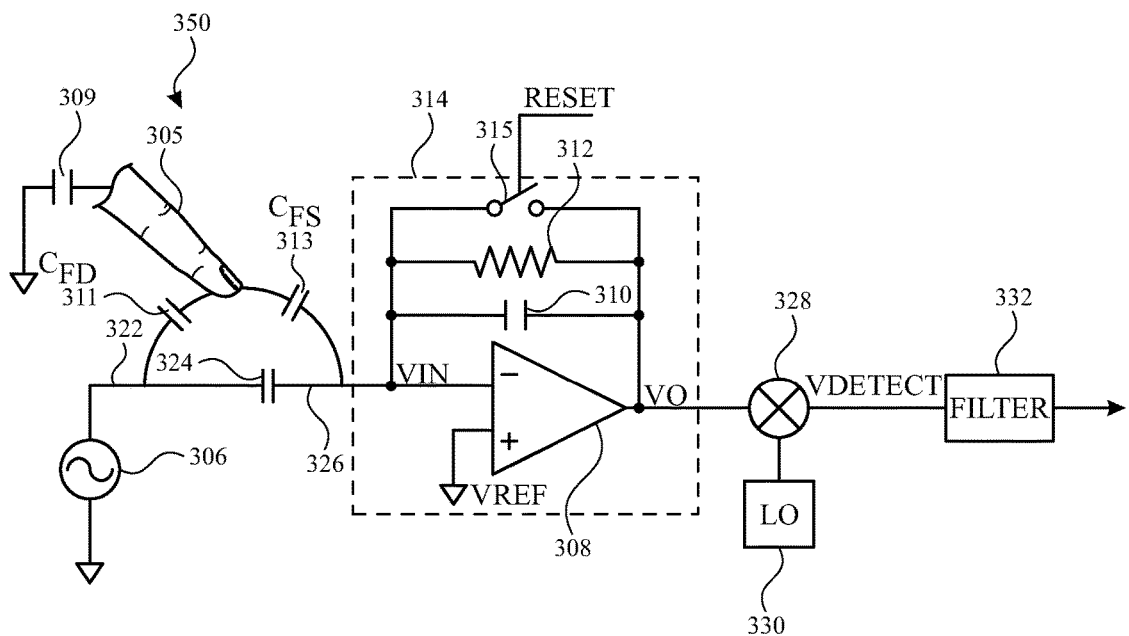
FIG. 3B illustrates an exemplary touch sensor circuit corresponding to a mutual-capacitance drive line and sense line and sensing circuit according to examples of the disclosure.

FIG. 3B illustrates an exemplary touch sensor circuit 350 corresponding to a mutual-capacitance drive line 322 and sense line 326 and sensing circuit 314 according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can change (e.g., decrease). This change in mutual capacitance 324 can be detected to indicate a touch or proximity event at the touch node, as described herein. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage $V_{ref}$. Operational amplifier 308 can drive its output to voltage $V_o$ to keep $V_{in}$ substantially equal to $V_{ref}$, and can therefore maintain $V_{in}$ constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce $V_{detect}$. $V_{detect}$ can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of $V_{detect}$ can be used to determine if a touch or proximity event has occurred. Note that while FIGS. 3A-3B indicate the demodulation at multiplier 328 occurs in the analog domain, output Vo may be digitized by an analog-to-digital converter (ADC), and blocks 328, 332 and 330 may be implemented in a digital fashion (e.g., 328 can be a digital demodulator, 332 can be a digital filter, and 330 can be a digital NCO (Numerical Controlled Oscillator).

Referring back to FIG. 2, in some examples, touch screen 220 can be an integrated touch screen in which touch sensing circuit elements of the touch sensing system can be integrated into the display pixel stack-ups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
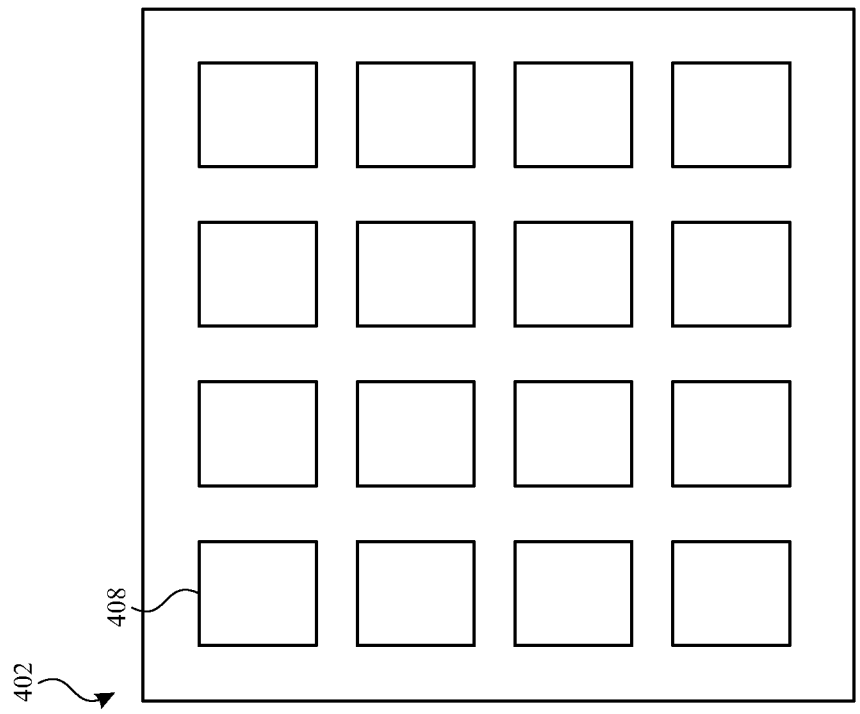
FIG. 4B illustrates touch screen with touch node electrodes arranged in a pixelated touch node electrode configuration according to examples of the disclosure.
Figure 4A:
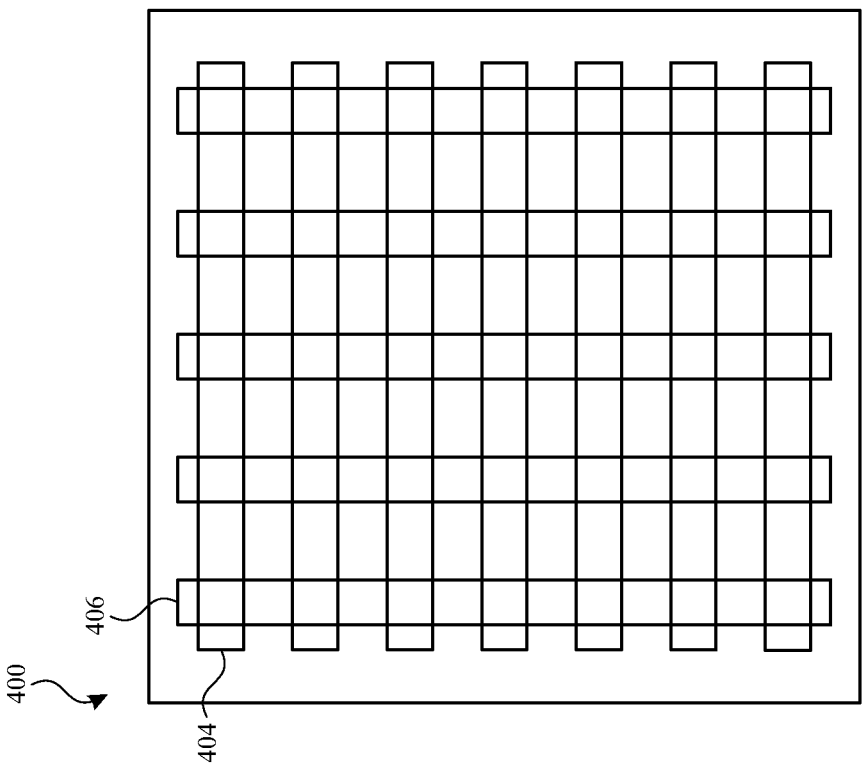
FIG. 4A illustrates touch screen with touch electrodes arranged in rows and columns according to examples of the disclosure.

FIG. 4A illustrates touch screen 400 with touch electrodes 404 and 406 arranged in rows and columns according to examples of the disclosure. Specifically, touch screen 400 can include a plurality of touch electrodes 404 disposed as rows, and a plurality of touch electrodes 406 disposed as columns. Touch electrodes 404 and touch electrodes 406 can be on the same or different material layers on touch screen 400, and can intersect with each other, as illustrated in FIG. 4A. In some examples, the electrodes can be formed on opposite sides of a transparent (partially or fully) substrate and from a transparent (partially or fully) semiconductor material, such as ITO, though other materials are possible. Electrodes displayed on layers on different sides of the substrate can be referred to herein as a double-sided sensor. In some examples, touch screen 400 can sense the self-capacitance of touch electrodes 404 and 406 to detect touch and/or proximity activity on touch screen 400, and in some examples, touch screen 400 can sense the mutual capacitance between touch electrodes 404 and 406 to detect touch and/or proximity activity on touch screen 400.

Although FIG. 4A illustrates touch electrodes 404 and touch electrodes 406 as rectangular electrodes, in some examples, other shapes and configurations are possible for row and column electrodes. For example, in some examples, some or all row and column electrodes can be formed from multiple touch electrodes formed on one side of substrate from a transparent (partially or fully) semiconductor material. The touch electrodes of a particular row or column can be interconnected by coupling segments and/or bridges. Row and column electrodes formed in a layer on the same side of a substrate can be referred to herein as a single-sided sensor. For example, as described in more detail below (e.g., in FIG. 6), row and column electrodes can have a diamond architecture in which a plurality of diamond-shaped touch electrodes (touch electrodes having diamond shapes) are arranged to form rows and a plurality of diamond-shaped touch electrodes are arranged to form columns.

FIG. 4B illustrates touch screen 402 with touch node electrodes 408 arranged in a pixelated touch node electrode configuration according to examples of the disclosure. Specifically, touch screen 402 can include a plurality of individual touch node electrodes 408, each touch node electrode identifying or representing a unique location on the touch screen at which touch or proximity (i.e., a touch or proximity event) is to be sensed, and each touch node electrode being electrically isolated from the other touch node electrodes in the touch screen/panel, as previously described. Touch node electrodes 408 can be on the same or different material layers on touch screen 402. In some examples, touch screen 402 can sense the self-capacitance of touch node electrodes 408 to detect touch and/or proximity activity on touch screen 402, and in some examples, touch screen 402 can sense the mutual capacitance between touch node electrodes 408 to detect touch and/or proximity activity on touch screen 402.

Figure 5A:
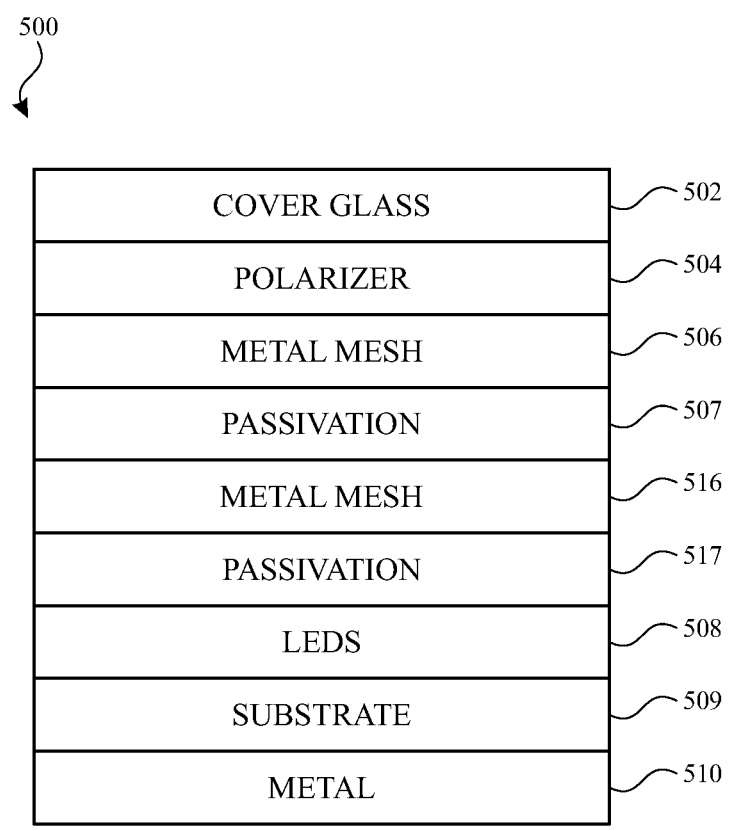
FIG. 5A illustrates an example touch screen stack-up including a metal mesh layer according to examples of the disclosure.
Figure 5B:
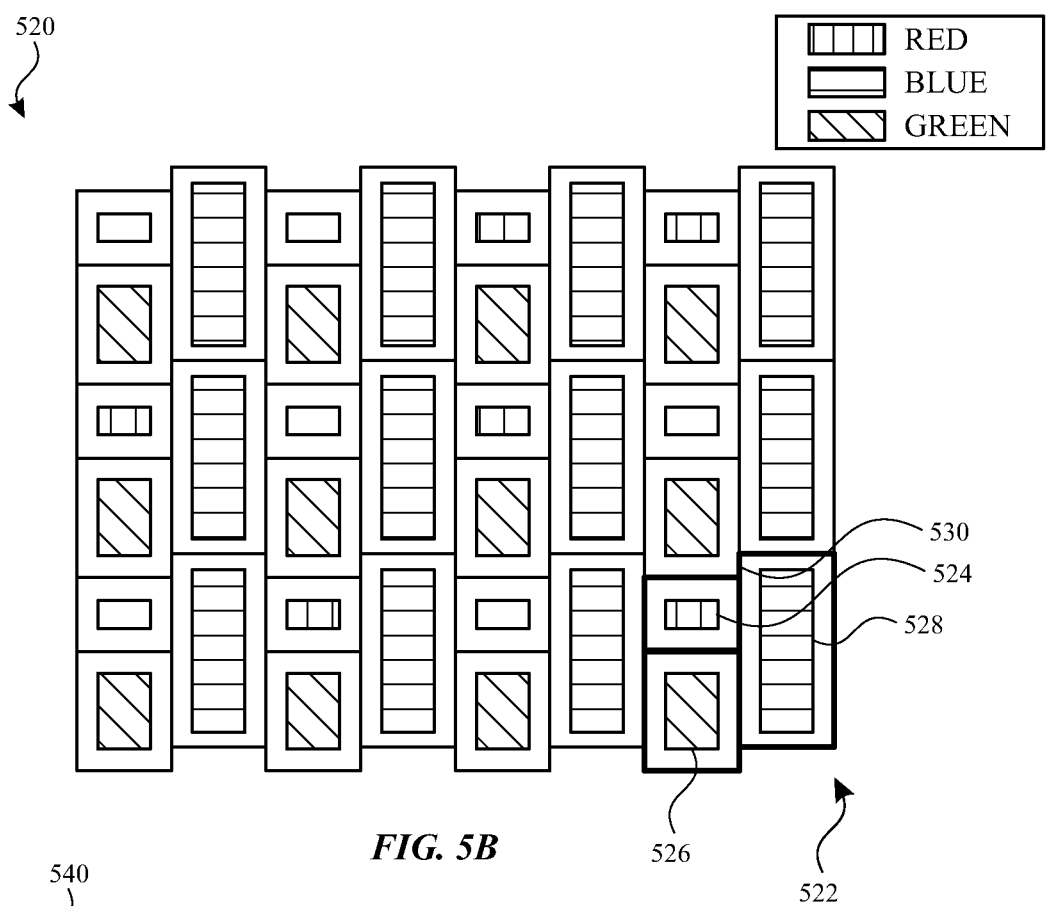
FIG. 5B illustrates a top view of a portion of a touch screen according to examples of the disclosure.

As described herein, in some examples, touch electrodes of the touch screen can be formed from a metal mesh. FIG. 5A illustrates an example touch screen stack-up including a metal mesh layer according to examples of the disclosure. Touch screen 500 can include a substrate 509 (e.g., a printed circuit board) upon which display LEDs 508 can be mounted. In some examples, the LEDs 508 can be partially or fully embedded in substrate 509 (e.g., the components can be placed in depressions in the substrate). Substrate 509 can include routing traces in one or more layers (e.g., represented by metal layer 510 in FIG. 5A) to route the LEDs to display driving circuitry (e.g., display driver 234). The stack-up of touch screen 500 can also include one or more passivation layers deposited over the LEDs 508. For example, the stack-up of touch screen 500 illustrated in FIG. 5 can include a passivation layer 507 (e.g., transparent epoxy) and passivation layer 517. Passivation layers 507 and 517 can planarize the surface for respective metal mesh layers. Additionally, the passivation layers can provide electrical isolation (e.g., between metal mesh layers and between the LEDs and a metal mesh layer. Metal mesh layer 516 (e.g., copper, silver, etc.) can be deposited on the planarized surface of the passivation layer 517 over the display LEDs 508, and metal mesh layer 506 (e.g., copper, silver, etc.) can be deposited on the planarized surface of passivation layer 507. In some examples, the passivation layer 517 can include material to encapsulate the LEDs to protect them from corrosion or other environmental exposure. Metal mesh layer 506 and/or metal mesh layer 516 can include a pattern of conductor material in a mesh pattern described below. Additionally, although not shown in FIG. 5A, a border region (e.g., a region that is not visible to a user) around the display active area can include metallization (or other conductive material) that may not be a metal mesh pattern. In some examples, metal mesh is formed of a non-transparent material but the metal mesh wires are sufficiently thin and sparse to appear transparent to the human eye. The touch electrodes (and some routing) as described herein can be formed in the metal mesh layer(s) from portions of the metal mesh. In some examples, polarizer 504 can be disposed above the metal mesh layer 506 (optionally with another planarization layer disposed over the metal mesh layer 506). Cover glass (or front crystal) 502 can be disposed over polarizer 504 and form the outer surface of touch screen 500. It is understood that although two metal mesh layers (and two corresponding planarization layers) are illustrated, in some examples more or fewer metal mesh layers (and corresponding planarization layers) can be implemented FIG. 5B illustrates a top view of a portion of touch screen 500 according to examples of the disclosure. The top view shows metal mesh 520 (e.g., a portion of metal mesh layer 506) together with LEDs 508 of touch screen 500. The LEDs can be arranged in groups of three proximate LEDs, including a red LED (e.g., red LED 524), a green LED (e.g., green LED 526), and a blue LED (e.g., blue LED 528), to form standard red-green-blue (RGB) display pixels. Although primarily described herein in terms of an RGB display pixel, it is understood that other touch pixels are possible with different numbers of LEDs and/or different color LEDs. The metal mesh can be formed of conductors (e.g., metal mesh wires) disposed in a pattern to allow light to pass (at least vertically) through the gaps in the mesh (e.g., the LEDs 508 can be disposed in the LED layer opposite openings in the metal mesh disposed in the metal mesh layer(s) 506 and/or 516). In other words, the conductors of metal mesh layer can be patterned so that conceptually flattening the metal mesh layer and LEDs into the same layer, the conductors and the LEDs do not overlap. In some examples, the metal mesh wires in the metal mesh layer may overlap (at least partially) some of the LEDs 508, but may be thin enough or sparse enough to not obstruct a human's view of the LEDs.

FIG. 5B includes example metal mesh unit 522 (shown in bold) including an example display pixel and corresponding metal mesh unit (shown in bold). Example unit 522 includes a display pixel with a red LED 524, a green LED 526, and a blue LED 528. The corresponding metal mesh can be formed of conductive material 530 (e.g., a metallic conductor such as copper, silver, etc.) disposed in the metal mesh layer around the perimeter of the LEDs (optionally with some space between the LED and the metal material in the plane of the touch screen). The metal mesh can, in some examples, form a rectangular shape (or other suitable shape including polygonal shapes, etc.) around each of the LEDs, as illustrated in FIG. 5B. The pattern of LEDs forming the display pixels can be repeated across the touch screen to form the display. During fabrication, the metal mesh in the example unit 522 can repeat across the touch screen to form a touch screen with uniform optical characteristics. It should be understood that the arrangement of LEDs and the corresponding metal mesh are merely an example, and other arrangements of LEDs and corresponding metal mesh patterns are possible.

Figure 5C:
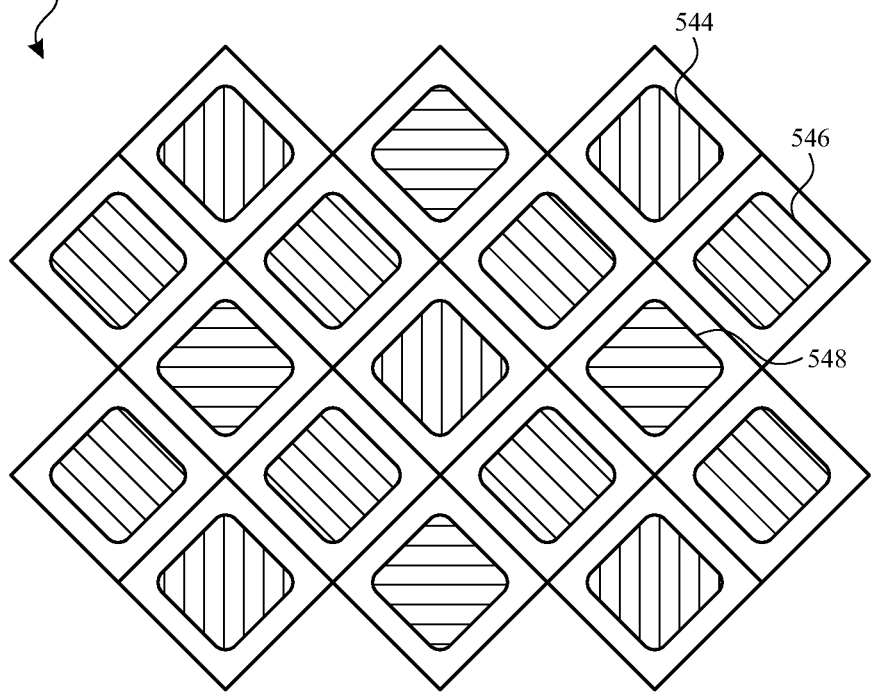
FIG. 5C illustrates a top view of a portion of a touch screen in a diamond pattern according to examples of the disclosure.

For example, FIG. 5C illustrates a top view of a portion of touch screen 500 in a diamond pattern according to examples of the disclosure. The top view shows metal mesh 540 (e.g., a portion of metal mesh layer 506) together with LEDs 508 of touch screen 500. The LEDs can be arranged in groups of three proximate LEDs, including a red LED (e.g., red LED 544), a green LED (e.g., green LED 546), and a blue LED (e.g., blue LED 548), to form standard red-green-blue (RGB) display pixels. Although primarily described herein in terms of an RGB display pixel, it is understood that other touch pixels are possible with different numbers of LEDs and/or different color LEDs. The metal mesh can be formed of conductors (e.g., metal mesh wires) disposed in a pattern to allow light to pass (at least vertically) through the gaps in the mesh (e.g., the LEDs 508 can be disposed in the LED layer opposite openings in the metal mesh disposed in the metal mesh layer(s) 506 and/or 516). In other words, the conductors of metal mesh layer can be patterned so that conceptually flattening the metal mesh layer(s) and LEDs into the same layer, the conductors and the LEDs do not overlap. In some examples, the metal mesh wires in the metal mesh layer may overlap (at least partially) some of the LEDs 508, but may be thin enough or sparse enough to not obstruct a human's view of the LEDs. The metal mesh 540 can formed in a diamond pattern around LEDs arranged in a diamond configuration.

As described herein, the touch electrodes and/or routing can be formed from the metal mesh. To form the electrically isolated touch electrodes or electrically isolated groups of touch electrodes (e.g., groups of touch electrodes forming row electrodes or column electrodes), the metal mesh can be cut (e.g., chemically or laser etched, among other possibilities) to form a boundary between two adjacent touch electrodes, between two adjacent routing traces or between a routing trace and adjacent touch electrode. The cut in the metal mesh can electrically isolate the metal mesh forming a first touch electrode (or first group of touch electrodes) from the metal mesh forming a second touch electrode (or second group of touch electrodes). Similarly, cuts to the metal mesh can be made to electrically isolate the metal mesh forming a first touch electrode from a first routing trace or to electrically isolate the first routing trace from a second routing trace.

Figure 6:
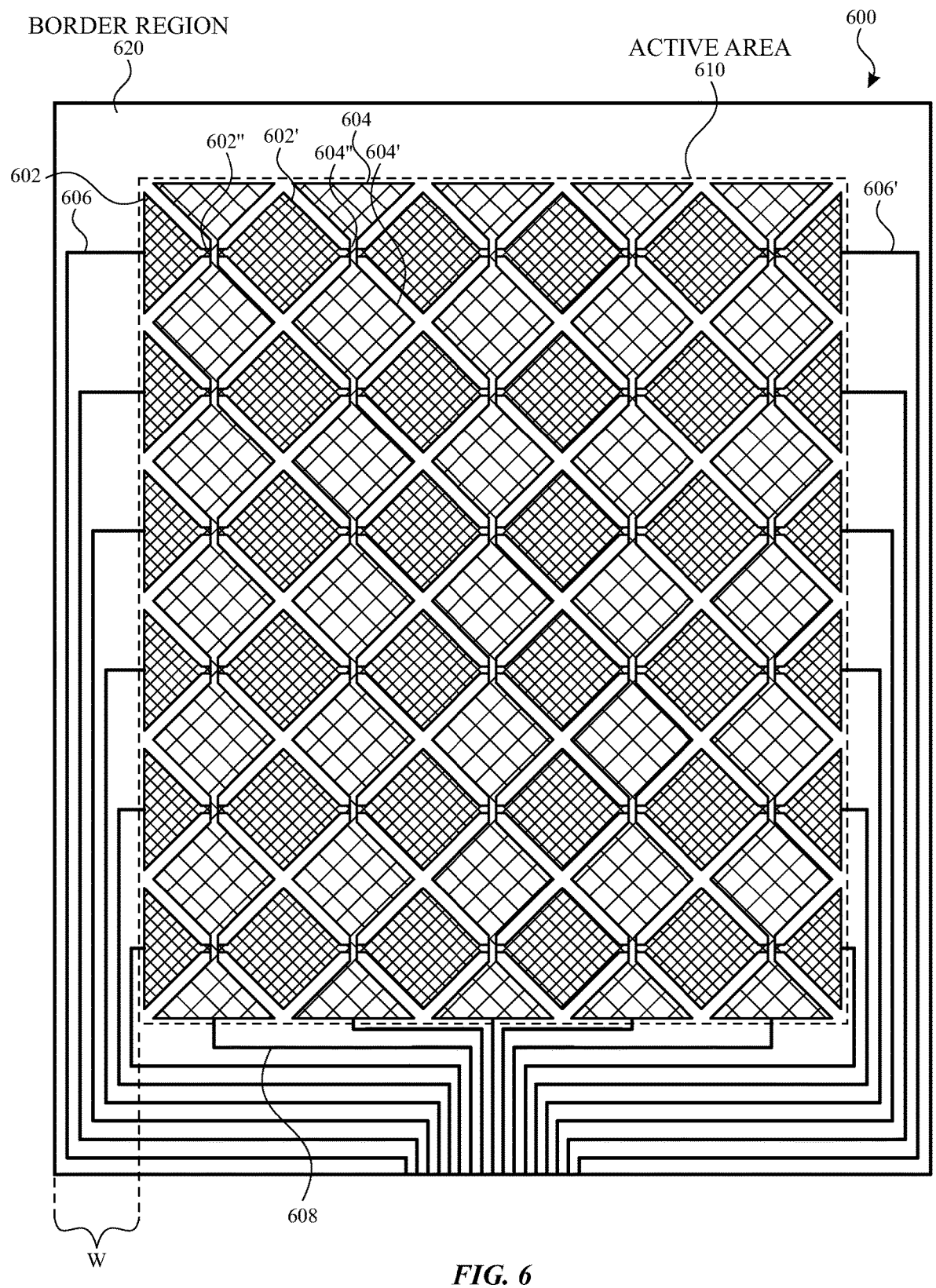
FIG. 6 illustrates an example touch screen including row and column electrodes according to examples of the disclosure.

As mentioned above, in some examples, a touch screen can include row electrodes and/or column electrodes formed from multiple touch electrodes having a diamond architecture. FIG. 6 illustrates an example touch screen 600 including row and column electrodes according to examples of the disclosure. Touch screen 600 illustrated in FIG. 6 includes row electrodes 602 formed of diamond-shaped touch electrodes 602' and column electrodes 604 formed of diamond-shaped touch electrodes 604'. Touch electrodes near the perimeter of touch screen 600 can be truncated such that the touch electrode is a portion of a diamond-shaped touch electrode (e.g., a half-diamond). The touch electrodes forming a respective row electrode or column electrode can be connected. For example, touch electrodes 602' of a respective row electrode 602 can be connected via conductors 602" (e.g., conductive segments) and touch electrodes 604' of a respective column electrode 604 can be connected via conductors 604" (e.g., bridges). As described herein with respect to FIGS. 5A-5C, in some examples, row electrodes 602 and column electrodes 604 can be formed of metal mesh. In some examples, the touch electrodes 602' and 604' forming row electrodes 602 and column electrodes 604 can be disposed in a first metal mesh layer (e.g., corresponding to metal mesh layer 506) and bridging conductors 604" can be formed of metal mesh in a second metal mesh layer (e.g., corresponding to metal mesh layer 516), and can be coupled to the touch electrodes 604' in the first metal mesh layer (e.g., by a via). In some examples, a conductor 604" maybe a wire bond or other bridge formed without using a second metal mesh layer.

Touch screen 600 can include row electrodes 602 and column electrodes 604 disposed over a display. In some examples, row electrodes 602 and column electrodes 604 can overlap the display such that the touch electrodes overlay the active area 610 (visible area) of the display (indicated by the dashed line). In some examples, the touch electrodes may cover more or less than the active area 610. In some examples, as illustrated in FIG. 6, row electrodes 602 and column electrodes 604 can be routed to touch sensing circuitry (e.g., touch controller 206) via routing traces in the border region 620 outside of active area 610. For example, routing traces 606 in the left hand side of border region 620 can route row electrodes 602 from the active area to the bottom side of border region 620 and routing traces 608 in the bottom side of border region 620 can route column electrodes 604 from the active area to the bottom side of border region 620. In some examples, the routing traces 606 and 608 can terminate in bond pads for a flexible circuit. It is understood that FIG. 6 represents one implementation of routing traces and that other implementations are possible. For example, row electrodes 602 can additionally or alternatively be routed via optional routing traces 606' (in the right hand side of border region 620) and column traces can be additionally or alternatively routed from the top side of border region 620 (via optional routing traces, not shown). Additionally, in some examples, the routing traces 606 can terminate on the left hand side of the border area in bond pads. Although FIG. 6 illustrates touch screen 600 as including six row electrodes and five column electrodes, it is understood that touch screen 600 can include different numbers of row electrodes and/or column electrodes.

Figure 7:
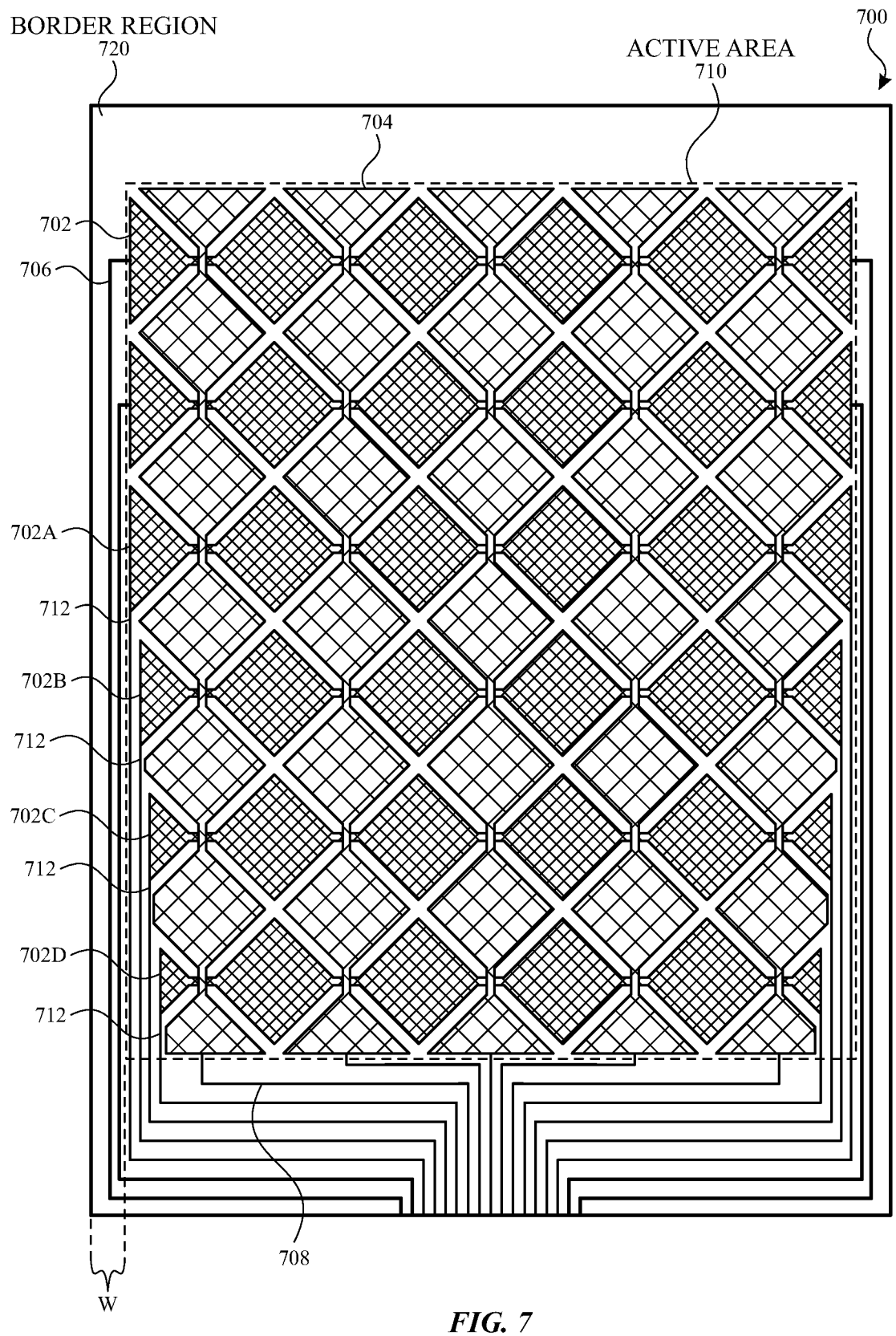
FIG. 7 illustrates an example touch screen with some routing traces routed within the active area according to examples of the disclosure.

In some examples, the border region (e.g., border region 620) of a touch screen can be reduced by routing some (or all) of the traces within the active area (e.g., active area 610) of a touch screen. FIG. 7 illustrates an example touch screen 700 with some routing traces routed within the active area according to examples of the disclosure. Touch screen 700 can include row electrodes 702 and column electrodes 704 overlaid over active area 710 (e.g., corresponding to row electrodes 602, column electrodes 604, and active area 610). Although FIG. 7 illustrates touch screen 700 as including six row electrodes and five column electrodes, it is understood that touch screen 700 can include different numbers of row electrodes and/or column electrodes. Some row electrodes 702 can be routed via routing traces 706 in border region 720 and column electrodes 704 can be routed via routing traces 708 in the border region 720 (e.g., corresponding to routing traces 606, 608 in border region 620). Unlike in touch screen 600 in FIG. 6, however, in touch screen 700 of FIG. 7, some row electrodes 702 can be routed via routing traces 712 disposed at least partially (or entirely) within active area 710. For example, FIG. 7 illustrates a touch sensor panel including four row electrodes 702A-702D with routing traces 712 disposed in active area 710 (not in the left hand side of border region 720) and two row electrodes with routing traces not disposed in active area 710 (disposed in the left hand side of border region 720). In some examples, the routing can also be mirrored on the right hand side of touch screen 700. It should be understood that the touch screen can include a different number of row electrodes with routing in the active area and a different number of row electrodes with routing outside the active area.

By using routing traces 712 within the active area 710, the border region can be reduced. For example, the width of the left hand side of border region 720 (labeled "W" in FIG. 7) can be reduced with respect to the width of the left hand side of border region 620 (labeled "W" in FIG. 6). In a similar manner the right hand side of border region 720 can be reduced compared with the right hand side of border region 620 by routing some of the routing traces in active area 710. Although not illustrated in FIG. 7, in some examples, the border on the top and bottom can also be reduced by moving some routing traces for column electrodes 704 at least partially within the active area 710.

Figure 8:
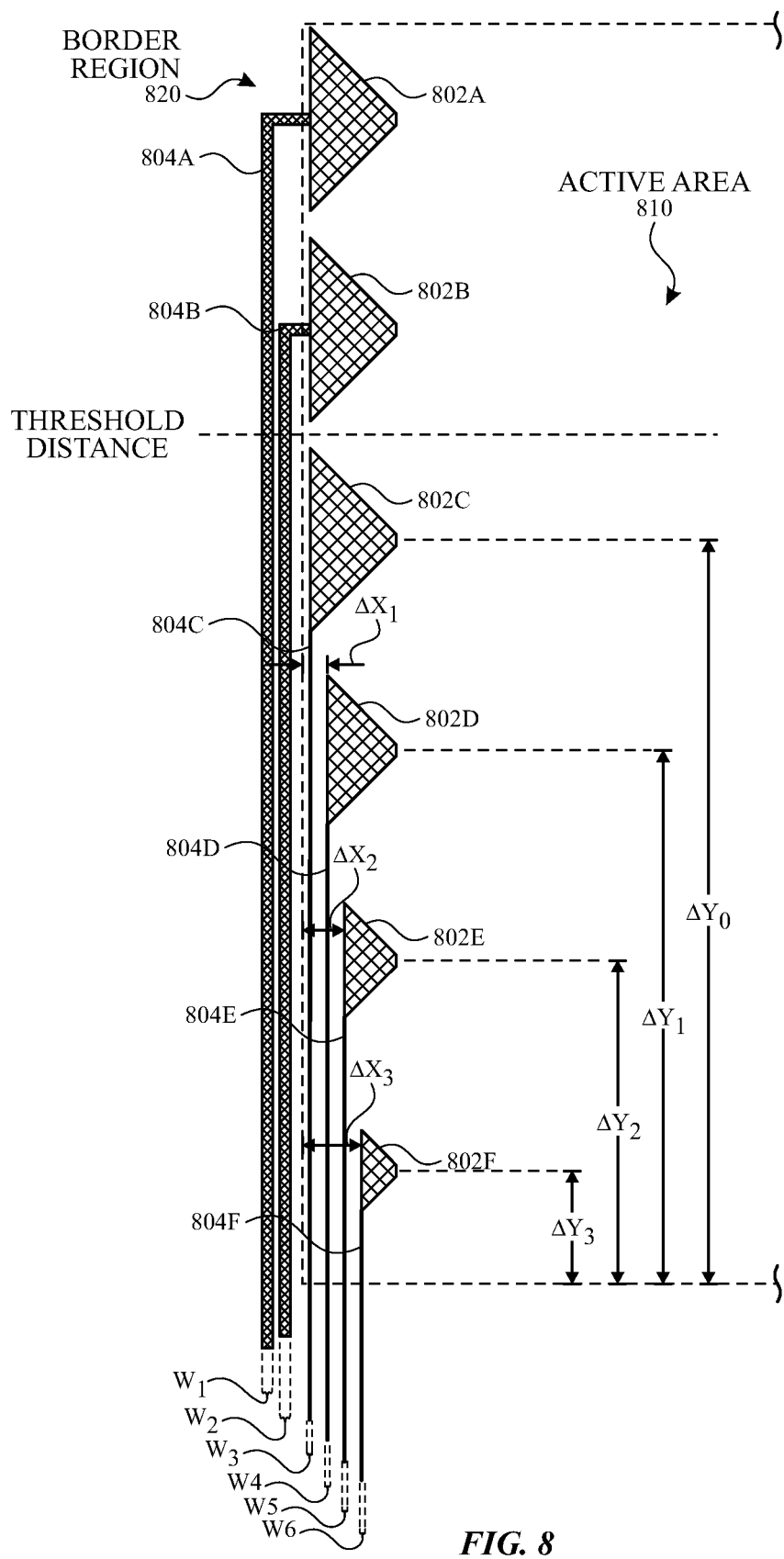
FIG. 8 illustrates a portion of a touch screen including some routing traces routed within the active area according to examples of the disclosure.

To make space for routing traces 712 in active area 710 (in the same metal mesh later as the row electrodes), some touch electrodes of row electrodes along the edge of active area 710 can be reduced in size. In some examples, to make space for routing traces 712 in active area 710 some touch electrodes of a column electrode proximate to the edge of active area 710 can be reduced in size. FIG. 8 illustrates a portion of a touch screen 700 including some routing traces routed within the active area according to examples of the disclosure. For example, FIG. 8 includes touch electrodes 802A-802F (e.g., corresponding to left-most touch electrodes 702' in FIG. 7) and corresponding routing traces 804A-804F (e.g., corresponding to routing traces 706, 712). Routing traces 804A and 804B corresponding to touch electrodes 802A and 802B can be routed in border region 820 and routing traces 804C-804F corresponding to touch electrodes 802C-802F can be routed in active area 810. To accommodate routing traces 804C-804F, touch electrodes 802D-802F can be shaved to reduce their size (e.g., by removing metal mesh in corresponding regions to form routing traces). For example, touch electrode 802F can have an offset $\Delta X_3$ from the left hand side of active area 810, touch electrode 802E can have an offset $\Delta X_2$ from the left hand side of active area 810, and touch electrode 802D can have an offset $\Delta X_1$ from the left hand side of active area 810, where $\Delta X_1 < \Delta X_2 < \Delta X_3$. Touch electrode 802C can have an offset of zero, such that touch electrode 802C can be the same size offset as touch electrodes 802A and 802B. As a result of non-zero offsets, touch electrodes 802D-802F can, in some examples, have a smaller area. In some examples, touch electrode 802C can also have a non-zero offset. Although not shown in FIG. 8 (but shown in FIG. 7), the touch electrode of a column electrode closest to the left hand side of active area 810 can also be shaved down, in some examples, to accommodate the routing traces in the active area (formed in the same metal mesh layer).

As described herein, some routing traces (e.g., routing traces 804C-804F) can be disposed in the active area and some routing traces (e.g., routing traces 804A and 804B) can be disposed in the border region. In some examples, a row electrode within a threshold distance of a (bottom) edge of the active area can be routed by routing traces in the active area, and a row electrode outside of the threshold distance can be routed in the border region. For example, row electrodes corresponding to touch electrodes 802C-802F can have offsets $\Delta Y_{0-3}$ respectively that can be less than the threshold distance from the bottom edge of the active area (the edge proximate to the termination of the routing traces in the bottom side of the border region). Thus, routing traces with longer paths (that can negatively impact the routing trace impedance) can be disposed in the border region where the width of the routing trace can be increased (to counteract the increased impedance due to trace length). Routing traces with shorter paths can have narrower routing traces and can be disposed in the active area (where the narrowness of the routing trace least impacts the touch performance due to minimal shaving of the touch electrodes). As illustrated in FIG. 8, the widths ($W_1$ and $W_2$) of routing traces 804A and 804B can be greater than the widths ($W_3$-$W_6$) of routing traces 804C-804F. In some examples, routing traces 804A and 804B can have the same width ($W_1=W_2$). In some examples, routing traces 804A and 804B can have different widths ($W_1!=W_2$). For example, the width of routing trace 804A can be greater than the width of routing trace 804B due to the relatively longer path length of routing trace 804A compared with routing trace 804B ($W_1>W_2$). In a similar manner, in some examples, the width of the routing traces in the active area can be the same width ($W_3=W_4=W_5=W_6$) or different widths. In some examples, the widths of the routing traces in the active area can decrease the closer the respective touch electrode is to the bottom edge (edge proximate to termination of the routing traces) of the active area ($W_3>W_4>W_5>W_6$).

In some examples, the number of routing traces in the border region and the number of routing traces in the active area (or the threshold distance) can determined based on a tradeoff between impedance performance and border region size. For example, increasing the number of active area routing traces can reduce the border region size. However, increasing the number of active area routing traces can also increase the routing trace impedance as the distance to the row electrodes increases (due to the relative narrowness of active area traces over border area traces). As a result, the maximum routing trace impedance can increase for shorter active area routing traces compared with longer border region routing traces. In some examples, empirical data can be used to optimize the number of routing traces in the active area (to reduce the border width) such that the maximum routing trace impedance is minimized for the routing traces.

Figure 9A:
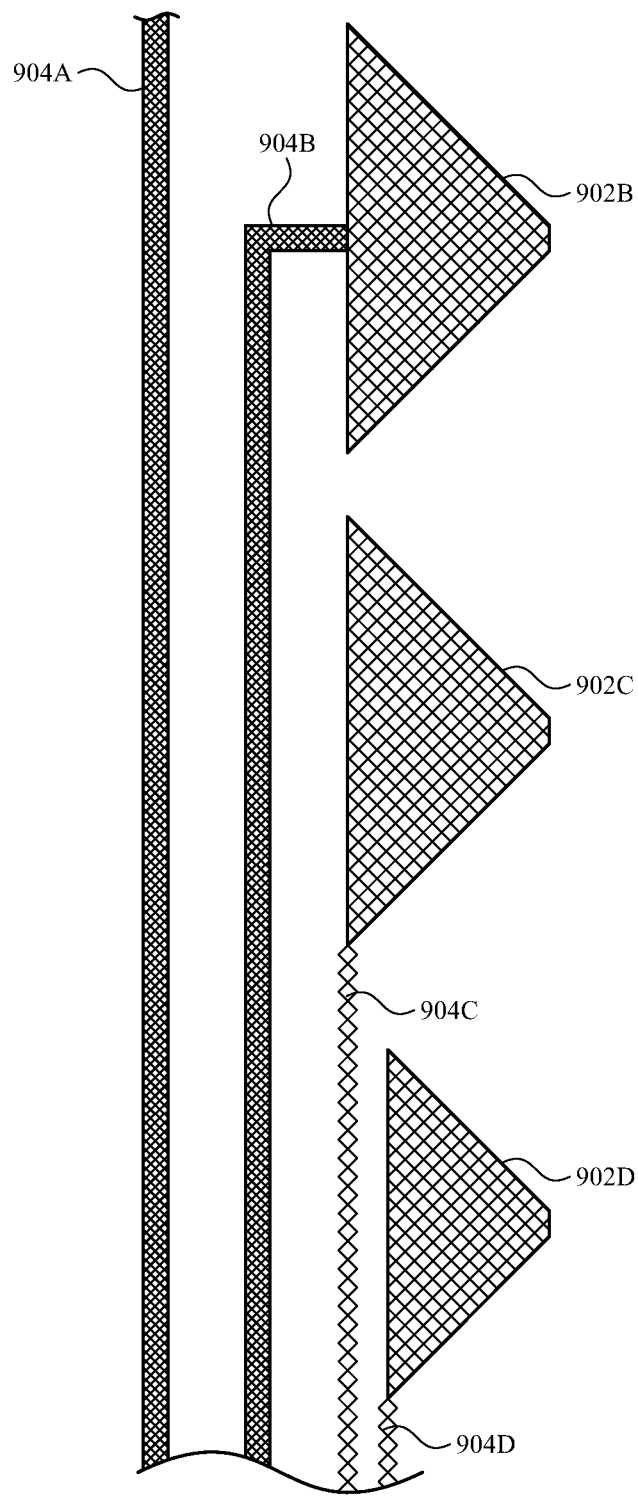
FIG. 9A illustrates example routing traces and touch electrodes according to examples of the disclosure.

As described herein, the touch electrodes and routing traces in the active area can be formed of metal mesh. FIG. 9A illustrates example routing traces and touch electrodes according to examples of the disclosure, including touch electrodes and routing traces in the active area formed from metal mesh (in the same metal mesh layer). As an alternative to the rectangular metal mesh illustrated in FIG. 5B, in some examples, the metal mesh can also be formed in a diamond pattern (or other polygonal-shaped pattern) as shown in FIG. 5C. As illustrated in FIG. 9A, touch electrodes 902B, 902C and 902D (e.g., corresponding to 802B, 802C and 802D, respectively) can be formed from metal mesh wires forming diamond shapes. In addition to forming touch electrodes 902B, 902C and 902D from metal mesh, routing traces in the active area can also be formed from the metal mesh. For example, routing traces 904C and 904D in the active area can be formed from metal mesh. In some examples, routing traces in the border region (e.g., routing traces 904A and 904B) can be formed from conductors other than metal mesh. In some examples, routing traces formed in the border area can also be formed of metal mesh.

As illustrated in FIG. 9A, routing traces 904C and 904D can have a width of two "metal mesh wire paths" (including the pitch distance spacing therebetween) such that the metal mesh wires form a closed diamond shape (or other polygonal shape). For example, an imaginary vertical line bisecting routing trace 904C or 904D can be viewed as providing two unique "metal mesh wire paths," each metal mesh wire path capable of providing an electrical coupling path. By using two metal mesh wire paths (effectively doubling number of metal mesh wires forming the routing trace), the effective impedance of the routing trace can be reduced. In some examples, the routing trace can be separated by cuts or electrical discontinuities in the metal mesh wires between the routing traces.

Figure 9B:
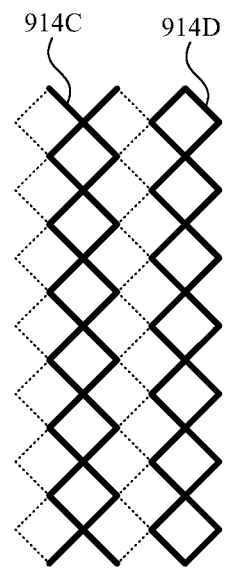
FIGS. 9B-9C illustrate example metal mesh routing traces according to examples of the disclosure.

FIG. 9B illustrates example metal mesh routing traces 914C and 914D according to examples of the disclosure that can correspond to a magnified view of a portion of routing traces 904C and 904D. As shown in FIG. 9B, routing traces 914C and 914D can have a width of two metal mesh wire paths (including the pitch distance therebetween). In some examples, the routing traces 914C and 914D can be separated by a width of one metal mesh wire path (and associated pitch distance). In some examples, the metal mesh forming the one metal mesh wire path between the routing traces can be removed entirely (e.g., the dashed line representing the metal mesh wire path can be removed entirely). In some examples, the routing trace can be separated by cuts or electrical discontinuities in the metal mesh wires between the routing traces without entirely removing the metal mesh wire path between the routing traces. In some examples, the spacing between routing traces can be more than the width of one metal mesh wire path.

Figure 9C:
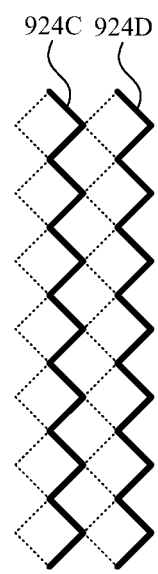

Although a width of two metal mesh wire paths (forming a closed polygonal shape are shown in FIGS. 9A-9B), it should be understood that a different width is possible. For example, the width can be one metal mesh wire path (e.g., half of the routing trace illustrated in FIGS. 9A-9B, bisected by the imaginary vertical line) or more than two metal mesh wire paths (e.g., 3, 4, etc.). For example, FIG. 9C illustrates example metal mesh routing traces 924C and 924D according to examples of the disclosure that can be routed in the active area to touch electrodes. As shown in FIG. 9C, routing traces 924C and 924D can have a width of one metal mesh wire path. In some examples, the routing traces 924C and 924D can be separated by a width of one metal mesh wire path in a similar manner as described above with respect to FIG. 9B.

Additionally, although the width of routing traces is uniform for each routing trace illustrated in FIGS. 9A-9C, it should be understood that in some examples, the width may not be uniform. For example, as described above, in some example, the further a row electrode is from the bottom edge of the active area, the wider the routing trace can be. Additionally, although the width of routing traces is uniform for the length of the routing traces illustrated in FIG. 9A-9C, it should be understood that the width could vary within the active area (or outside the active area). For example, the width can be two metal mesh wire paths in a first region of the active area and can be more or less than two metal mesh wire paths in a second region of the active area. Additionally, although the two metal mesh wire paths are shown together (adjacent paths forming closed polygonal shapes) in FIGS. 9A-9B, it should be understood that metal mesh wire paths for a given touch electrode can be separated (e.g., spaced to form non-adjacent metal mesh wire paths), but remain electrically connected (e.g., at the touch electrode and/or in the border region).

In some examples, the width (and arrangement) of the metal mesh wires forming the routing traces in the active area can be optimized. For example, the width of the metal mesh wires (the number of metal mesh wires) can be tradeoff between the routing trace impedance and the impact on touch sensor performance. For example, increasing the width of the routing trace (or number of metal mesh wires) can reduce the impedance of the routing trace. However, increasing the width of the routing trace (or number of metal mesh wires) can require more shaving of the metal mesh forming touch electrodes (to make space for the wider routing traces in the same metal mesh layer). More shaving the metal mesh touch electrodes can reduce the optical uniformity of the touch screen and can reduce uniformity of the touch signal measured at edges of the touch screen.

Referring back to FIGS. 6 and 7, touch screens 600 and 700 including row and column electrodes formed of diamond-shaped touch electrodes (or a portion of a diamond along the edges of the touch screen). In some examples, one or more of the diamond-shaped touch electrodes can include a ground (or other potential) electrode or a floating electrode. For example, the ground or floating electrodes can be regions of conductive material positioned within a larger touch electrode (e.g., in the same metal mesh layer), and resistively isolated from the touch electrode. In some examples, the touch electrode, the ground electrode and the floating electrode can be formed of metal mesh with the ground electrode and/or floating electrode isolated from the touch electrode by cuts or electrical discontinuities in the metal mesh wires forming the touch electrode. In some examples, the ground or floating electrodes can be formed of other conductive materials/films (e.g., ITO or other electrical conductors, transparent or otherwise, rather than metal mesh). In some examples, row electrodes can include one or more ground electrodes in one or more of its touch electrodes, and column electrodes can include one or more floating electrodes in one or more of its touch electrodes. In some examples, column electrodes can include one or more ground electrodes in one or more of its touch electrodes, and row electrodes can include one or more floating electrodes in one or more of its touch electrodes.

Figure 10:
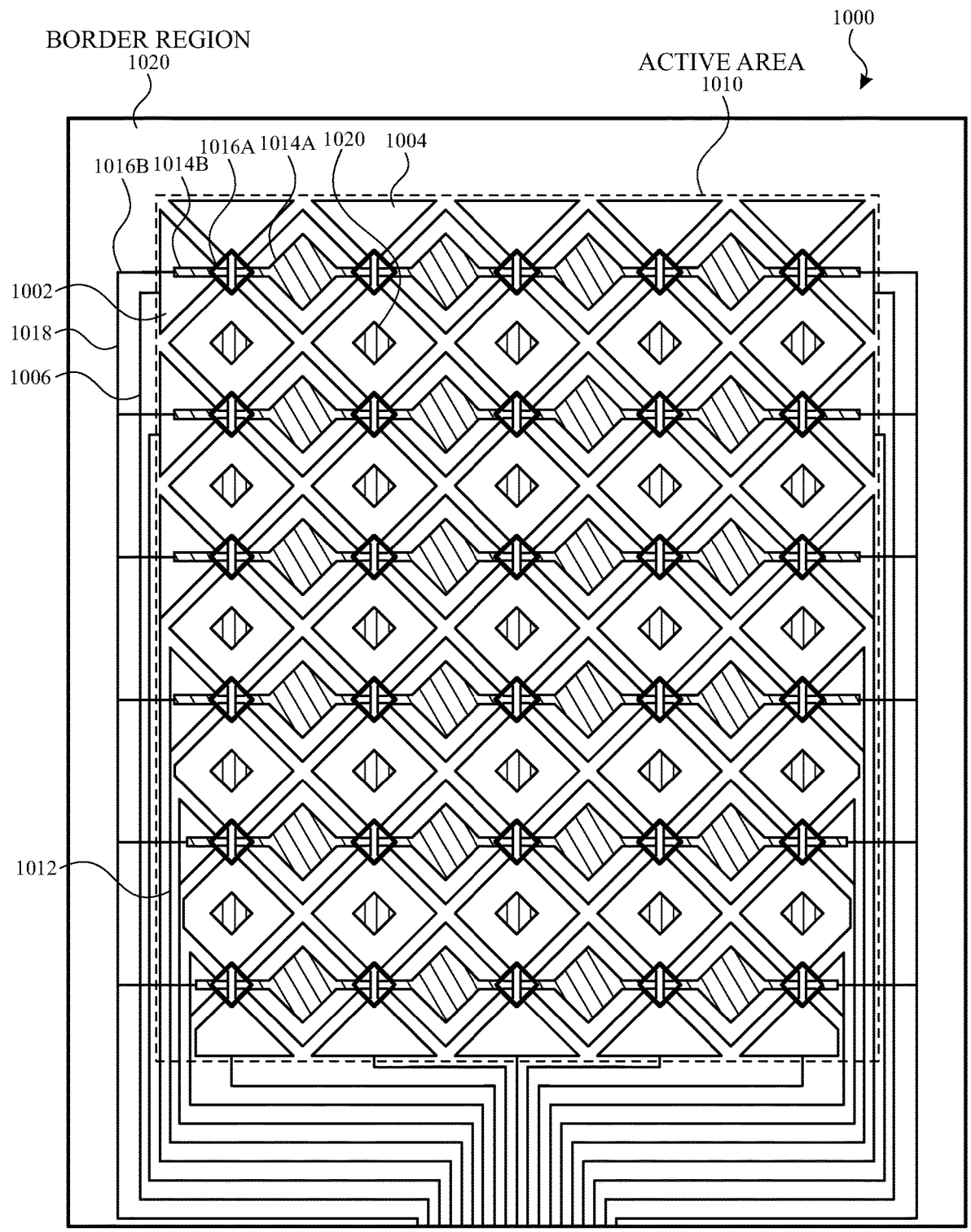
FIG. 10 illustrates an example touch screen including row and column electrodes according to examples of the disclosure.

FIG. 10 illustrates an example touch screen 1000 including row and column electrodes according to examples of the disclosure. Touch screen 1000 includes row electrodes 1002 and column electrodes 1004 formed of diamond-shaped touch electrodes (e.g., similar to touch screens 600 and 700). One or more of the diamond-shaped touch electrodes in rows electrodes 1002 can include a ground (or other potential) electrode(s) 1014A and 1014B. One or more of the diamond-shaped touch electrodes in column electrodes 1004 can include a floating electrode 1022. In some examples, the ground electrodes embedded within the touch electrodes can be electrically coupled together and to a ground routing trace 1018 (e.g., in border region 1020). For example, ground electrodes 1014A and 1014B can be coupled via bridge 1016B (illustrated as a diamond), and ground electrode 1014B can be coupled to ground routing trace 1018 via bridge 1016A. Bridges 1016A and/or 1016B can be formed in a different layer than the metal mesh layer in which touch electrodes are formed, in some examples. In some examples, bridges 1016A and/or 1016B can be coupled via metal layer 510 in or proximate to substrate 509. In some examples, touch electrodes forming row electrodes 1002, column electrodes 1004, ground electrodes 1014A-1014B, and floating electrodes 1022 can be disposed in a first metal mesh layer (e.g., corresponding to metal mesh layer 506) and bridges 1016A and/or 1016B can be formed of metal mesh in a second metal mesh layer (e.g., corresponding to metal mesh layer 516), and can be coupled to the ground electrodes in the first metal mesh layer. In some examples, bridges between the active area and the border region can be partially formed of metal mesh (e.g., in the active area) and partially formed of non-metal mesh conductors (e.g., in the border region).

Figure 11:
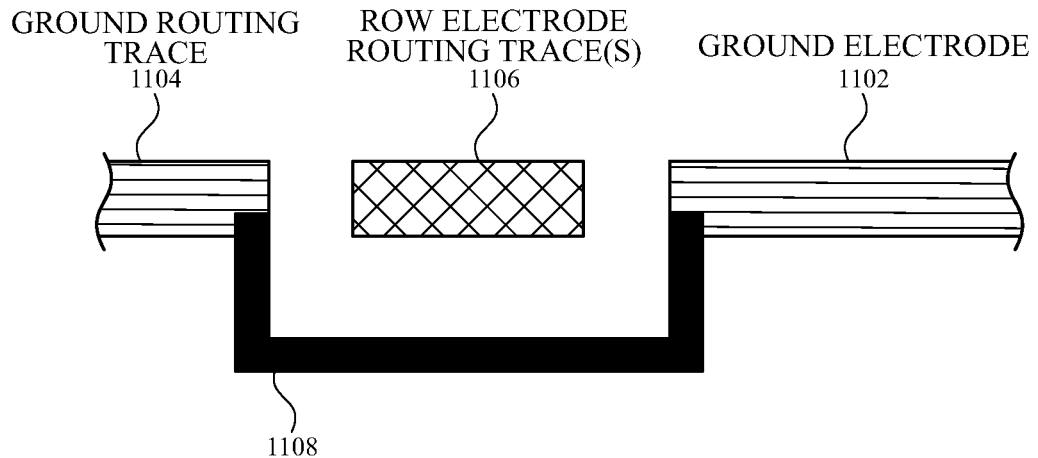
FIG. 11 illustrates a cross-sectional view of a bridge between a ground electrode and a ground routing trace according to examples of the disclosure.

FIG. 11 illustrates a cross-sectional view of a bridge between a ground electrode and a ground routing trace according to examples of the disclosure. Ground electrode 1102 can correspond to a ground electrode 1014B, ground routing trace 1104 can correspond to ground routing trace 1018, and row electrode routing trace(s) 1106 can correspond to one or more row electrode routing traces 1006 (e.g., in border region 1020) and/or 1012 (e.g., in active area 1010). Ground electrode 1102, ground routing trace 1104, and row electrode routing traces 1106 can be disposed in the same layer of metal mesh (e.g., corresponding to metal mesh layer 506) and/or other conductive material (e.g., in the border region). Bridge 1108 can correspond to bridge 1016B. Bridge 1108 can bypass the one or more row electrode routing trace(s) 1106, and can electrically couple ground electrodes embedded in the row electrodes, such as ground electrode 1002, to ground routing trace 1104. In some examples, bridge 1108 can be formed of metal mesh in a second metal mesh layer (e.g., corresponding to metal mesh layer 516), and can be coupled to ground electrodes (and routing traces) formed in the first metal mesh layer (e.g., by vias). In a similar manner, bridges between ground electrodes 1014A and 1014B (e.g., corresponding to bridge 1016A) can be formed in the second metal mesh layer to couple ground electrodes formed in the first metal mesh layer.

Figure 12:
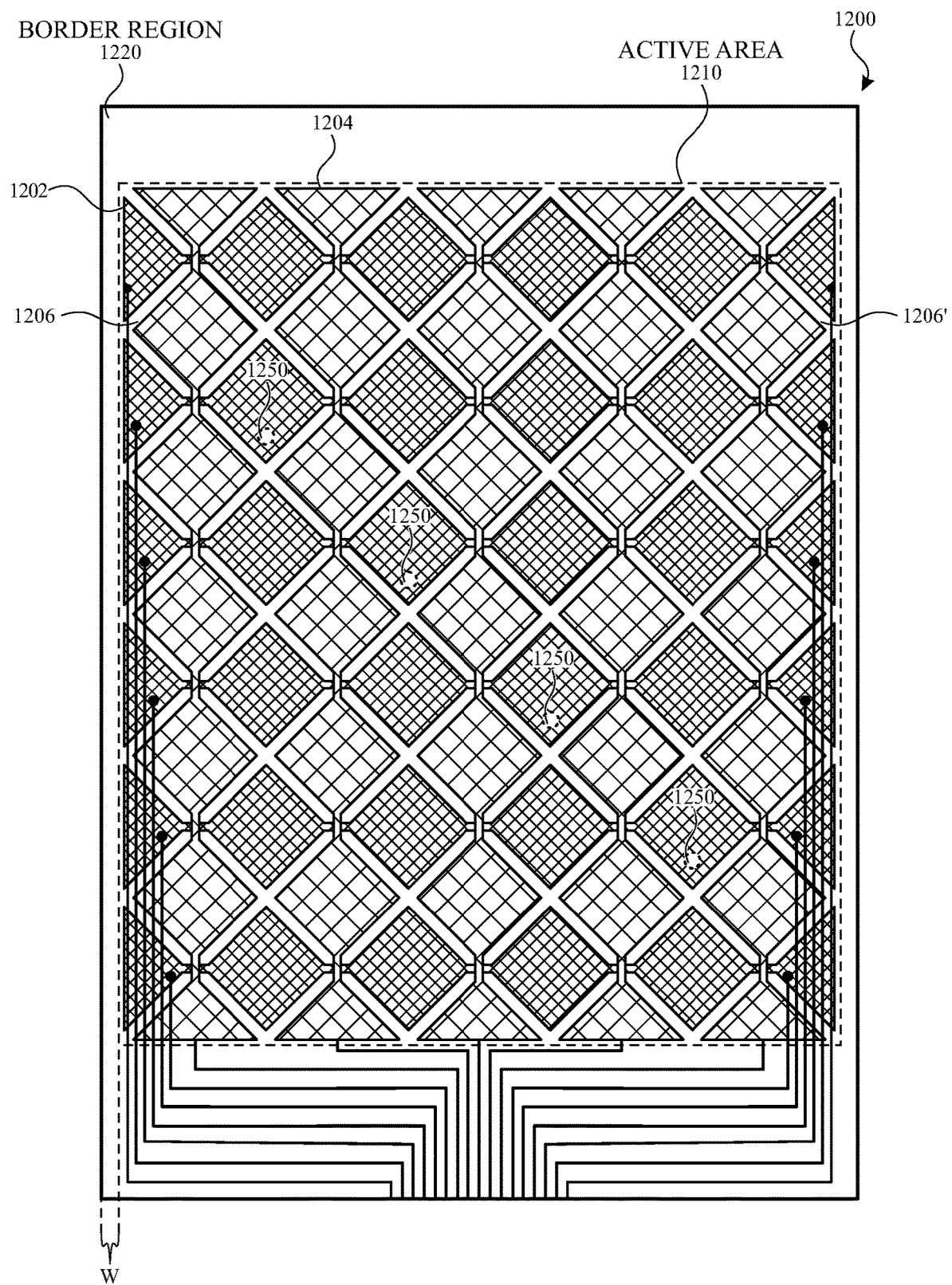
FIG. 12 illustrates an example touch screen including routing traces routed within the active area according to examples of the disclosure.
Figure 13:
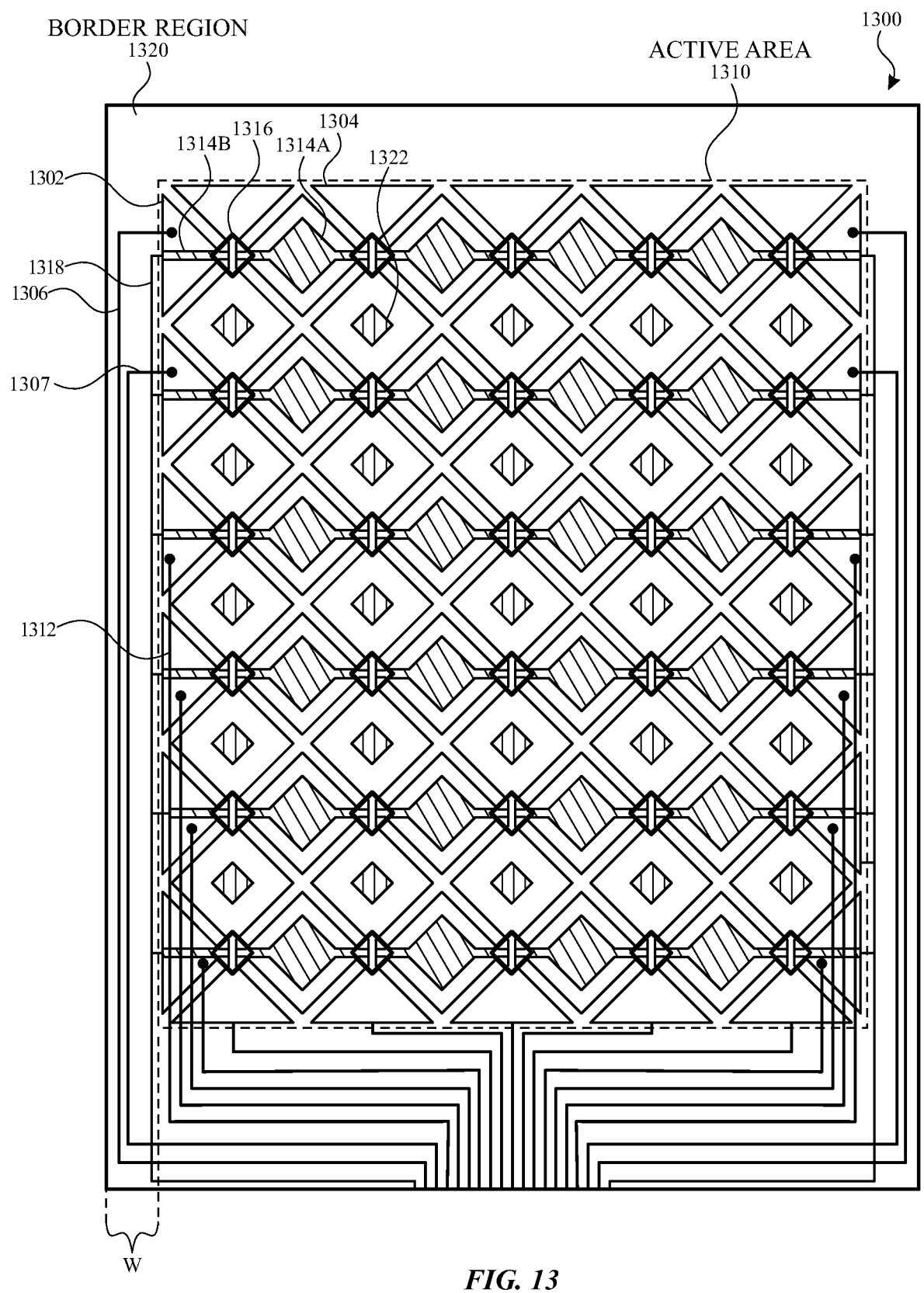
FIG. 13 illustrates an example touch screen including row and column electrodes according to examples of the disclosure

In some examples, rather than reducing the size of some touch electrodes of row electrodes along the edge of the active area, some (or all) of the routing traces for row electrodes can be disposed within the active area of a touch screen in another layer. FIG. 12 illustrates an example touch screen 1200 including routing traces routed within the active area according to examples of the disclosure. Touch screen 1200 can include row electrodes 1202 and column electrodes 1204 overlaid over active area 1210 (e.g., corresponding to row electrodes 1202, column electrodes 1204, and active area 1210). Although FIG. 12 illustrates touch screen 1200 as including six row electrodes and five column electrodes, it is understood that touch screen 1200 can include different numbers of row electrodes and/or column electrodes. Unlike in touch screen 600 in FIG. 6, in touch screen 1200 of FIG. 12, some row electrodes 1202 can be routed via routing traces 1206 disposed at least partially (or entirely) within active area 1210. For example, as illustrated in FIG. 12, all illustrated row electrodes 1202 can be routed via routing traces 1206. In some examples, the routing can also be mirrored on the right hand side of touch screen 1200 such that the row electrodes 1202 can also be routed by routing traces 1206'. Although FIG. 12 illustrates all row electrodes 1202 routed via routing traces in the active area, it should be understood that in some examples, some row electrodes 1202 can be routed via routing traces in border region 1220 (e.g., as illustrated in FIG. 13). For example, routing traces within a threshold distance of the (bottom) edge of the active area can be routed by routing traces in the active area, and a row electrode outside of the threshold distance can be routed in the border region (e.g., due to the increased impedance associated with longer routing traces).

Routing traces 1206 within the active area 1210 can be formed from metal mesh. For example, row electrodes 1202 (and column electrodes 1204) can be formed in a first metal mesh layer (e.g., corresponding to metal mesh layer 506) and routing traces 1206 can be formed in a second metal mesh layer (e.g., corresponding to metal mesh layer 516). Routing some or all of the row electrodes in the active area can allow for reducing the border region by removing the routing for some or all of the row electrodes from the border region. For example, the width of the left hand side of border region 1220 (labeled "W" in FIG. 12) can be reduced with respect to the width of the left hand side of border region 620 (labeled "W" in FIG. 6). In a similar manner the right hand side of border region 1220 can be reduced compared with the right hand side of border region 620 by routing some or all of the routing traces in active area 1210. Additionally, because routing traces 1206 can be formed of metal mesh over active area 1210, touch electrodes of row electrodes along the edge of the active area may not be reduced in size (e.g., in contrast to the illustration of reducing touch electrode size in FIGS. 7 and 8).

In some examples, routing traces 1206 can have a width of two "metal mesh wire paths" (including the pitch distance spacing therebetween) such that the metal mesh wires form a closed diamond shape (or other polygonal shape), as illustrated in FIG. 9B. It should be understood that a different width is possible. For example, the width can be one metal mesh wire path as illustrated in FIG. 9C. In some examples, the width of routing traces can be the same for each routing trace. In some examples, the width of routing traces may not be uniform. For example, the further a row electrode is from the (bottom) edge of the active area, the wider the routing trace can be. In some examples, the width of routing traces can be uniform or non-uniform for the length of the routing traces (e.g., the width can be two metal mesh wire paths in a first region of the active area and can be more or less than two metal mesh wire paths in a second region of the active area).

Although routing traces 1206 (and 1206') are shown at or near (within a threshold distance of) the edges of active area 1210, it should be understood that the routing trace to a respective row electrode can be coupled to a non-edge touch electrode of a row electrode. For example, dashed circles 1250 in FIG. 12 can represent an additional or alternative point of coupling of routing traces to touch electrodes of respective row electrodes.

In some examples, a touch screen including routing traces in the active area as described with respect to FIG. 12 can also include ground and/or floating electrodes (e.g., similar to touch screen 1000 of FIG. 10). FIG. 13 illustrates an example touch screen 1300 including row and column electrodes according to examples of the disclosure. Touch screen 1300 includes row electrodes 1302 and column electrodes 1304 formed of diamond-shaped touch electrodes. One or more of the diamond-shaped touch electrodes in rows electrodes 1302 can include a ground (or other potential) electrode(s) 1314A and 1314B. One or more of the diamond-shaped touch electrodes in column electrodes 1304 can include a floating electrode 1322. In some examples, the ground electrodes embedded within the touch electrodes can be coupled together and to a ground routing trace 1318 (e.g., in border region 1320). For example, ground electrodes 1314A and 1314B can be coupled via bridge 1316 (illustrated as a diamond), and ground electrode 1314B can be coupled to ground routing trace 1318. Bridges 1316 can be formed in a different layer than the metal mesh, in some examples. In some examples, bridges 1316 can be coupled via metal layer 510 in or proximate to substrate 509. In some examples, touch electrodes forming row electrodes 1302, column electrodes 1304, ground electrodes 1314A-1314B, and floating electrodes 1322 can be disposed in a first metal mesh layer (e.g., corresponding to metal mesh layer 506) and bridges 1316 can be formed of metal mesh in a second metal mesh layer (e.g., corresponding to metal mesh layer 516), and can be coupled to the ground electrodes in the first metal mesh layer.

In addition, some row electrodes 1302 (or all row electrodes as illustrated in FIG. 12) can be routed in active area 1310 by routing traces 1312 formed of metal mesh in a second metal mesh layer (e.g., corresponding to metal mesh layer 516), and can be coupled to the row electrodes in the first metal mesh layer (e.g., by a via). In some examples, some of row electrodes 1302 can be routed by routing traces 1306 in border region 1320. In some examples, a connection between a routing trace 1306 in the border region 1320 and a row electrode 1302 in active region 1310 can be made via a bridge 1307 over ground routing trace 1318. In some examples, bridge 1307 can be formed in a metal layer (e.g., metal layer 510) or at least partially in a metal mesh layer (e.g., metal mesh layer 516). In some examples, bridges between the active area and the border region (e.g., such as bridges 1307) can be partially formed of metal mesh (e.g., in the active area) and partially formed of non-metal mesh conductors (e.g., in the border region).

Figure 14:
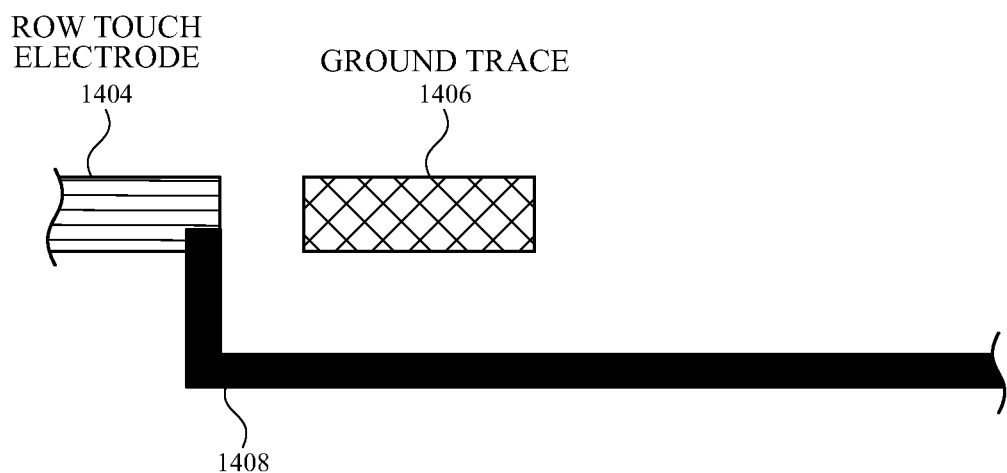
FIG. 14 illustrates a cross-sectional view of a row electrode routing trace over a ground electrode in the active area according to examples of the disclosure.

FIG. 14 illustrates a cross-sectional view of a row electrode routing trace over a ground electrode in the active area according to examples of the disclosure. Ground electrode 1406 can correspond to a ground electrode 1314B, and row touch electrode 1404 can correspond a touch electrode of a row electrode 1302. Ground electrode 1406 and row touch electrode 1404 can be disposed in the same layer of metal mesh (e.g., corresponding to metal mesh layer 506) in the active region. Bridge 1408 can correspond to at least part of a row touch electrode routing trace 1312 in the active area. Bridge 1408 can bypass one (or more) ground electrodes 1406 in the active area (and can couple to additional routing outside of the active area). In some examples, bridge 1408 can be formed of metal mesh in a second metal mesh layer (e.g., corresponding to metal mesh layer 516), and can be coupled to row touch electrodes formed in the first metal mesh layer (e.g., by vias). In a similar manner, bridges between ground electrodes 1314A and 1314B (e.g., corresponding to bridge 1316) can be formed in the second metal mesh layer to couple ground electrodes formed in the first metal mesh layer.

Figure 15:
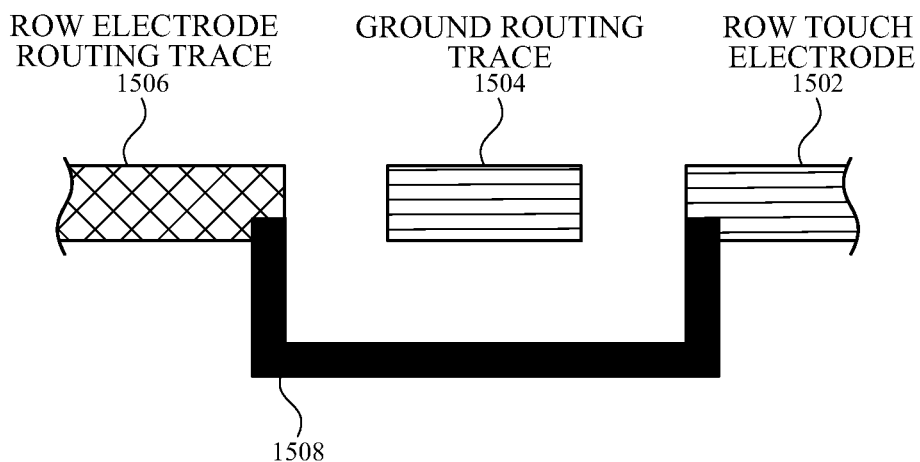
FIG. 15 illustrates a cross-sectional view of a bridge between a row touch electrode and a row electrode routing trace in a border region according to examples of the disclosure.

FIG. 15 illustrates a cross-sectional view of a bridge between a row touch electrode and a row electrode routing trace in a border region (over a ground routing trace) according to examples of the disclosure. Ground routing trace 1504 can correspond to ground routing trace 1318, row electrode routing trace 1506 can correspond to one or more row electrode routing traces 1306 and row touch electrode 1502 can correspond to a touch electrode of a row electrode 1302. Ground routing trace 1504, row touch electrode 1502, and row electrode routing trace 1506 can be disposed in the same layer of metal mesh (e.g., corresponding to metal mesh layer 506) and/or other conductive material (e.g., in the border region). Bridge 1508 can correspond to bridge 1307. Bridge 1508 can bypass ground routing trace 1504 (and, in some examples, one or more row electrode routing trace(s)), and can couple the row electrodes to a row electrode routing trace, such as row touch electrode 1502 to row electrode routing trace 1506. In some examples, bridge 1508 can be formed of metal mesh in a second metal mesh layer (e.g., corresponding to metal mesh layer 516), and can be coupled to row touch electrode 1502 formed in the first metal mesh layer (e.g., by vias) and/or to row electrodes routing trace 1506 in the border area.

Although FIGS. 7 and 10, for example, illustrate reducing the size of one or more metal mesh touch electrodes to enable active area row electrode routing in the same metal mesh layer, and FIGS. 12 and 13, for example, illustrate active area row electrode routing in a different metal mesh layer, it should be understood that the features of these figures are not mutually exclusive. For example, some row electrodes can be routed by active area routing traces (e.g., to the bottom border region) in the same metal mesh layer as the row electrodes (e.g., by reducing the size of one or more touch electrodes) and some row electrodes can be routed by active area routing traces in a different metal mesh layer than the row electrodes. In some examples, reducing the size of one or more metal mesh touch electrodes can be implemented to improve manufacturing yield when the impact on touch performance by reducing the size of one or more metal touch electrodes is within the design/application specification (e.g., less than a threshold). In some examples, routing in the active area without reducing the size of one or more touch electrodes can be employed where the impact on touch performance by reducing the size of one or more metal touch electrodes is outside the design/application specification (e.g., greater than a threshold).

Therefore, according to the above, some examples of the disclosure are directed to a touch screen. The touch screen can comprise: a display having an active area and row electrodes disposed over the active area of the display. A first row electrode of the row electrodes can be a first distance from a first edge of the display perpendicular to the row electrodes, and a second row electrode of the row electrodes can be a second distance, different from the first distance, from the first edge of the display. The touch screen can further comprise a first routing trace coupled to the first row electrode disposed in the active area of the display; and a second routing trace coupled to the second row electrode disposed in a border region around the active area of the display. Additionally or alternatively to one or more of the examples disclosed above, in some examples, a first plurality of the row electrodes including the second row electrode can be at the first distance from the first edge. One routing trace corresponding to one of the first plurality of row electrodes can be disposed in the active area of the display. Additionally or alternatively to one or more of the examples disclosed above, in some examples, the touch screen can further comprise a plurality of routing traces disposed in the active area of the display, each of the plurality of routing traces coupled to a corresponding one of a plurality of the row electrodes. Each of the plurality of row electrodes can be at different distances from the first edge. Additionally or alternatively to one or more of the examples disclosed above, in some examples, the first row electrode can comprise a plurality of coupled touch electrodes having diamond shapes. Additionally or alternatively to one or more of the examples disclosed above, in some examples, the first routing trace can cross from the active area of the display to the border region over a second edge of the display perpendicular to the first edge of the display. The first row electrode can be less than a threshold distance from the second edge. Additionally or alternatively to one or more of the examples disclosed above, in some examples, the second row electrode can be greater than the threshold distance from the second edge of the display. Additionally or alternatively to one or more of the examples disclosed above, in some examples, the second routing trace can be wider than the first routing trace. Additionally or alternatively to one or more of the examples disclosed above, in some examples, the second routing trace can be longer than the first routing trace. Additionally or alternatively to one or more of the examples disclosed above, in some examples, the first routing trace can be formed from metal mesh. Additionally or alternatively to one or more of the examples disclosed above, in some examples, the first routing trace can comprise metal mesh wires forming at least two paths from the first row electrode. Additionally or alternatively to one or more of the examples disclosed above, in some examples, the first routing trace can comprise metal mesh wires forming polygonal shapes in the active area. Additionally or alternatively to one or more of the examples disclosed above, in some examples, the first routing trace and the second routing trace can be formed in a common layer. Additionally or alternatively to one or more of the examples disclosed above, in some examples, the first row electrode can comprise a plurality of coupled touch electrodes having a ground electrode disposed within. Additionally or alternatively to one or more of the examples disclosed above, in some examples, the ground electrode of a first of the plurality of coupled touch electrodes and the ground electrode of a second of the plurality of coupled touch electrodes can be coupled together by a bridge. Additionally or alternatively to one or more of the examples disclosed above, in some examples, the ground electrode of a first of the plurality of coupled touch electrodes can be coupled to a ground electrode in the border region via a bridge bypassing the first routing trace. Additionally or alternatively to one or more of the examples disclosed above, in some examples, the plurality of coupled touch electrodes having the ground electrode disposed within can be formed in a first metal mesh layer and the bridge can be formed at least partially in a second metal mesh layer different from the first metal mesh layer.

Some examples of the disclosure are directed to a touch screen. The touch screen can comprise: a display having an active area; row electrodes disposed over the active area of the display formed in a first metal mesh layer; and a first routing trace coupled to a first row electrode of the row electrodes. The first routing trace can be disposed in the active area of the display, and the first routing trace can be formed in a second metal mesh layer different from the first metal mesh layer. Additionally or alternatively to one or more of the examples disclosed above, in some examples, the touch screen can further comprise: a second routing trace coupled to a second row electrode, the second routing trace disposed in a border region around the active area of the display. Additionally or alternatively to one or more of the examples disclosed above, in some examples, the first routing trace can cross from the active area of the display to the border region over a first edge of the display and the second routing trace can cross from the active area of the display to a border region over a second edge of the display perpendicular to the first edge of the display. The second row electrode can be greater than a threshold distance from the first edge. Additionally or alternatively to one or more of the examples disclosed above, in some examples, the first row electrode can be less than the threshold distance from the first edge of the display. Additionally or alternatively to one or more of the examples disclosed above, in some examples, the first routing trace coupled to a first row electrode of the row electrodes can be a first distance from the second edge of the display perpendicular to the row electrodes, and a third routing trace coupled to a third row electrode of the row electrodes can be a second distance from the second edge of the display different from the first distance. The third routing trace can be disposed in the active area of the display and the third routing trace can be formed in the second metal mesh layer different from the first metal mesh layer. Additionally or alternatively to one or more of the examples disclosed above, in some examples, the first row electrode can comprise a plurality of coupled touch electrodes having diamond shapes. Additionally or alternatively to one or more of the examples disclosed above, in some examples, a first plurality of the row electrodes including the first row electrode can be coupled to a plurality of routing traces including the first routing trace to corresponding touch electrodes of the first plurality of row electrodes within a first distance from a first edge of the display. The plurality of routing traces including the first routing trace can be disposed in the active area of the display. Additionally or alternatively to one or more of the examples disclosed above, in some examples, the first routing trace can be narrower than the second routing trace. Additionally or alternatively to one or more of the examples disclosed above, in some examples, the first routing trace can be shorter than the second routing trace. Additionally or alternatively to one or more of the examples disclosed above, in some examples, the first routing trace can comprise metal mesh wires forming at least two paths from the first row electrode. Additionally or alternatively to one or more of the examples disclosed above, in some examples, the first routing trace can comprise metal mesh wires forming polygonal shapes in the active area. Additionally or alternatively to one or more of the examples disclosed above, in some examples, the first routing trace and the second routing trace can be formed in different layers. Additionally or alternatively to one or more of the examples disclosed above, in some examples, the first row electrode can comprise a plurality of coupled touch electrodes having a ground electrode disposed within. Additionally or alternatively to one or more of the examples disclosed above, in some examples, the ground electrode of a first of the plurality of coupled touch electrodes and the ground electrode of a second of the plurality of coupled touch electrodes can be coupled together by a bridge in the second metal mesh layer. Additionally or alternatively to one or more of the examples disclosed above, in some examples, the ground electrode of a first of the plurality of coupled touch electrodes can be coupled to a ground electrode in the border region in the first metal mesh layer. Additionally or alternatively to one or more of the examples disclosed above, in some examples, the row electrodes can comprise a plurality of coupled touch electrodes having a ground electrode disposed within. One of the plurality of coupled touch electrodes can be coupled to a corresponding routing trace the border region via a bridge bypassing a ground electrode in the border region. Additionally or alternatively to one or more of the examples disclosed above, in some examples, the bridge bypassing the ground electrode in the border region can be disposed at least partially in the second metal mesh layer.

Some examples of the disclosure are directed to a device. The device can comprise an energy storage device, communication circuitry, and a touch screen. The touch screen can comprise: a display having an active area; row electrodes disposed over the active area of the display formed in a first metal mesh layer; and a first routing trace coupled to a first row electrode of the row electrodes. The first routing trace can be disposed in the active area of the display, and the first routing trace can be formed in a second metal mesh layer different from the first metal mesh layer. Additionally or alternatively to one or more of the examples disclosed above, in some examples, the touch screen can further comprise: a second routing trace coupled to a second row electrode, the second routing trace disposed in a border region around the active area of the display. Additionally or alternatively to one or more of the examples disclosed above, in some examples, the first routing trace can cross from the active area of the display to the border region over a first edge of the display and the second routing trace can cross from the active area of the display to a border region over a second edge of the display perpendicular to the first edge of the display. The second row electrode can be greater than a threshold distance from the first edge. Additionally or alternatively to one or more of the examples disclosed above, in some examples, the first row electrode can be less than the threshold distance from the first edge of the display. Additionally or alternatively to one or more of the examples disclosed above, in some examples, the first routing trace coupled to a first row electrode of the row electrodes can be a first distance from the second edge of the display perpendicular to the row electrodes, and a third routing trace coupled to a third row electrode of the row electrodes can be a second distance from the second edge of the display different from the first distance. The third routing trace can be disposed in the active area of the display and the third routing trace can be formed in the second metal mesh layer different from the first metal mesh layer. Additionally or alternatively to one or more of the examples disclosed above, in some examples, the first row electrode can comprise a plurality of coupled touch electrodes having diamond shapes. Additionally or alternatively to one or more of the examples disclosed above, in some examples, a first plurality of the row electrodes including the first row electrode can be coupled to a plurality of routing traces including the first routing trace to corresponding touch electrodes of the first plurality of row electrodes within a first distance from a first edge of the display. The plurality of routing traces including the first routing trace can be disposed in the active area of the display. Additionally or alternatively to one or more of the examples disclosed above, in some examples, the first routing trace can be narrower than the second routing trace. Additionally or alternatively to one or more of the examples disclosed above, in some examples, the first routing trace can be shorter than the second routing trace. Additionally or alternatively to one or more of the examples disclosed above, in some examples, the first routing trace can comprise metal mesh wires forming at least two paths from the first row electrode. Additionally or alternatively to one or more of the examples disclosed above, in some examples, the first routing trace can comprise metal mesh wires forming polygonal shapes in the active area. Additionally or alternatively to one or more of the examples disclosed above, in some examples, the first routing trace and the second routing trace can be formed in different layers. Additionally or alternatively to one or more of the examples disclosed above, in some examples, the first row electrode can comprise a plurality of coupled touch electrodes having a ground electrode disposed within. Additionally or alternatively to one or more of the examples disclosed above, in some examples, the ground electrode of a first of the plurality of coupled touch electrodes and the ground electrode of a second of the plurality of coupled touch electrodes can be coupled together by a bridge in the second metal mesh layer. Additionally or alternatively to one or more of the examples disclosed above, in some examples, the ground electrode of a first of the plurality of coupled touch electrodes can be coupled to a ground electrode in the border region in the first metal mesh layer. Additionally or alternatively to one or more of the examples disclosed above, in some examples, the row electrodes can comprise a plurality of coupled touch electrodes having a ground electrode disposed within. One of the plurality of coupled touch electrodes can be coupled to a corresponding routing trace the border region via a bridge bypassing a ground electrode in the border region. Additionally or alternatively to one or more of the examples disclosed above, in some examples, the bridge bypassing the ground electrode in the border region can be disposed at least partially in the second metal mesh layer.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch screen, comprising:
a display having an active area;
a plurality of row electrodes disposed in the active area and formed from a metal mesh, the plurality of row electrodes including a first row electrode and a second row electrode; and
a plurality of routing traces disposed in the active area and formed from the metal mesh, the plurality of routing traces including a first routing trace coupled to the first row electrode and a second routing trace coupled to the second row electrode;
wherein:
the first routing trace has a first width and a first length; and
the second routing trace has a second width greater than the first width and a second length greater than the first length.

2. The touch screen of claim 1, wherein the first width of the first routing trace corresponds to a first number of metal mesh wire paths and the second width of the second routing trace corresponds to a second number of metal mesh wire paths greater than the first number of metal mesh wire paths.

3. The touch screen of claim 2, wherein:
the first row electrode is offset from an edge of the active area at a first distance; and
the second row electrode is offset from the edge of the active area at a second distance, greater than the first distance and less than a threshold distance from the edge of the active area.

4. The touch screen of claim 3, wherein the plurality of row electrodes further includes a third row electrode, the touch screen further comprising:
a border area around the active area; and
a second plurality of routing traces disposed in the border area and including a third routing trace coupled to the third row electrode;
wherein:
the third routing trace has a third width different than the first width.

5. The touch screen of claim 4, wherein the third row electrode is not offset from the edge of the active area.

6. The touch screen of claim 4, wherein the third width of the third routing trace corresponds to a third number of metal mesh wire paths greater than the second number of metal mesh wire paths.

7. The touch screen of claim 4, wherein third width is different from the second width.

8. The touch screen of claim 4, wherein the second plurality of routing traces are formed from the metal mesh.

9. The touch screen of claim 4, wherein the second plurality of routing traces are formed from a conductor different from the metal mesh.

10. The touch screen of claim 1, wherein:
the first routing trace has a first effective impedance based on the first width and the first length; and
the second routing trace has a second effective impedance based on the second width and the second length;
wherein:

a difference between the first effective impedance and the second effective impedance is zero or within a threshold of zero.

11. A touch-sensitive device comprising:
an energy storage device;
communication circuitry;
a touch controller; and
a touch screen comprising:
   a display having an active area;
   a plurality of row electrodes disposed in the active area and formed from a metal mesh, the plurality of row electrodes including a first row electrode and a second row electrode; and
   a plurality of routing traces disposed in the active area and formed from the metal mesh, the plurality of routing traces including a first routing trace coupled to the first row electrode and a second routing trace coupled to the second row electrode;
   wherein:
      the first routing trace has a first width and a first length in the active area; and
      the second routing trace has a second width greater than the first width and a second length greater than the first length.

12. The touch-sensitive device of claim 11, wherein the first width of the first routing trace corresponds to a first number of metal mesh wire paths and the second width of the second routing trace corresponds to a second number of metal mesh wire paths greater than the first number of metal mesh wire paths.

13. The touch-sensitive device of claim 12, wherein:
the first row electrode is offset from an edge of the active area at a first distance; and
the second row electrode is offset from the edge of the active area at a second distance, greater than the first distance and less than a threshold distance from the edge of the active area.

14. The touch-sensitive device of claim 13, wherein the plurality of row electrodes further includes a third row electrode, the touch screen further comprising:
   a border area around the active area; and
   a second plurality of routing traces disposed in the border area and including a third routing trace coupled to the third row electrode;
   wherein:
      the third routing trace has a third width different than the first width.

15. The touch-sensitive device of claim 14, wherein the third row electrode is not offset from the edge of the active area.

16. The touch-sensitive device of claim 14, wherein the third width of the third routing trace corresponds to a third number of metal mesh wire paths greater than the second number of metal mesh wire paths.

17. The touch-sensitive device of claim 14, wherein third width is different from the second width.

18. The touch-sensitive device of claim 14, wherein the second plurality of routing traces are formed from the metal mesh.

19. The touch-sensitive device of claim 14, wherein the second plurality of routing traces are formed from a conductor different from the metal mesh.

20. The touch-sensitive device of claim 11, wherein:
the first routing trace has a first effective impedance based on the first width and the first length; and
the second routing trace has a second effective impedance based on the second width and the second length;
wherein:
   a difference between the first effective impedance and the second effective impedance is zero or within a threshold of zero.

* * * * *